US010174191B2

(12) United States Patent
Kitayama et al.

(10) Patent No.: US 10,174,191 B2
(45) Date of Patent: Jan. 8, 2019

(54) RESIN MATERIAL AND FILM THEREOF

(71) Applicant: KANEKA CORPORATION, Osakai-shi, Osaka (JP)

(72) Inventors: Fuminobu Kitayama, Hyogo (JP); Keisuke Hatano, Osaka (JP)

(73) Assignee: KANEKA CORPORATION, Osaka (JP)

( * ) Notice: Subject to any disclaimer, the term of this patent is extended or adjusted under 35 U.S.C. 154(b) by 318 days.

(21) Appl. No.: 15/038,310

(22) PCT Filed: Nov. 21, 2014

(86) PCT No.: PCT/JP2014/005855
§ 371 (c)(1),
(2) Date: May 20, 2016

(87) PCT Pub. No.: WO2015/075941
PCT Pub. Date: May 28, 2015

(65) Prior Publication Data
US 2016/0297958 A1 Oct. 13, 2016

(30) Foreign Application Priority Data
Nov. 22, 2013 (JP) .................................. 2013-242278

(51) Int. Cl.
| C08L 33/14 | (2006.01) |
| C08F 265/06 | (2006.01) |
| C08J 5/18 | (2006.01) |
| C08F 8/48 | (2006.01) |
| C08L 25/04 | (2006.01) |
| C08L 101/00 | (2006.01) |
| C08L 51/00 | (2006.01) |

(52) U.S. Cl.
CPC ............... *C08L 33/14* (2013.01); *C08F 8/48* (2013.01); *C08F 265/06* (2013.01); *C08J 5/18* (2013.01); *C08L 25/04* (2013.01); *C08L 51/006* (2013.01); *C08L 101/00* (2013.01); *C08J 2333/04* (2013.01); *C08J 2333/14* (2013.01); *C08J 2335/02* (2013.01); *C08J 2451/00* (2013.01); *C08L 2203/16* (2013.01); *C08L 2207/53* (2013.01)

(58) Field of Classification Search
CPC . C08L 2207/53; C08L 51/006; C08J 2451/00; C08F 265/06
See application file for complete search history.

(56) References Cited

U.S. PATENT DOCUMENTS

| 4,373,065 A | 2/1983 | Prest, Jr. |
| 4,916,171 A * | 4/1990 | Brown ................ C04B 20/1033 523/161 |
| 6,201,045 B1 | 3/2001 | Koike |
| 6,348,542 B1 | 2/2002 | Naruse et al. |
| 6,586,515 B1 | 7/2003 | Koike |
| 2005/0119389 A1 | 6/2005 | Koike |
| 2007/0243364 A1 | 10/2007 | Maekawa et al. |
| 2009/0306321 A1 | 12/2009 | Koike |
| 2014/0045995 A1 | 2/2014 | Shimamoto et al. |
| 2014/0221568 A1* | 8/2014 | Kikuta ....................... C08J 5/18 524/747 |
| 2016/0319121 A1 | 11/2016 | Kitayama |
| 2017/0022354 A1 | 1/2017 | Kitayama et al. |
| 2017/0031058 A1 | 2/2017 | Kitayama et al. |

FOREIGN PATENT DOCUMENTS

| CN | 1902240 A | 1/2007 |
| CN | 1946794 A | 4/2007 |
| CN | 103380175 | 10/2013 |
| JP | S63122748 A | 5/1988 |
| JP | 2002-023363 | 1/2002 |
| JP | 2005023272 | 1/2005 |
| JP | 3648201 B | 5/2005 |
| JP | 3696649 B | 9/2005 |
| JP | 2006124592 | 5/2006 |
| JP | 2006308682 | 11/2006 |
| JP | 2007191706 | 8/2007 |
| JP | 2007-254727 | 10/2007 |
| JP | 2008-179778 | 8/2008 |
| JP | 2008276207 A | 11/2008 |
| JP | 2009-203348 | 9/2009 |

(Continued)

OTHER PUBLICATIONS

English Machine Translation of JP2009-269975, prepared Jun. 8, 2018. (Year: 2018).*
Office Action issued for counterpart Chinese Patent Application No. 201480063589.8, dated Jul. 5, 2017, 18 pages including partial English translation.
Extended European Search Report issued for European Patent Application No. 14873372.8, dated Jul. 28, 2017, 7 pages.
International Preliminary Report on Patentability issued in International Application No. PCT/JP2014/005855, dated May 24, 2016, 13 pages.
Extended European Search Report for European Patent Application No. 14865247.2, dated Jun. 12, 2017, 6 pages.

(Continued)

*Primary Examiner* — Christopher M Rodd
(74) *Attorney, Agent, or Firm* — Hamre, Schumann, Mueller & Larson, P.C.

(57) ABSTRACT

The present invention provides a resin material and a film made of the resin material, the resin material being able to form a molded body having high transparency, excellent mechanical strength, few foreign matter defects, excellent heat stability, excellent solvent resistance, and extremely good appearance. The resin material contains a thermoplastic resin (A) and a polymer (B) satisfying the following conditions. That is, the polymer (B) is a graft copolymer obtained by multistep polymerization, and at least one step of the multistep polymerization is polymerization of a monomer mixture containing: a (meth)acrylic monomer having a ring structure; and (meth)acrylic acid and/or its salt.

33 Claims, No Drawings

(56) References Cited

FOREIGN PATENT DOCUMENTS

| | | | |
|---|---|---|---|
| JP | 2009-203434 | | 9/2009 |
| JP | 2009-203435 | | 9/2009 |
| JP | 4336586 B | | 9/2009 |
| JP | 2009204860 | | 9/2009 |
| JP | 2009-269975 | | 11/2009 |
| JP | 2009269975 A | * | 11/2009 |
| JP | 2009293021 | | 12/2009 |
| JP | 2010-096919 | | 4/2010 |
| JP | 2010-202798 | | 9/2010 |
| JP | 4624845 B | | 2/2011 |
| JP | 2012-255128 | | 12/2012 |
| JP | 2013-040325 | | 2/2013 |
| JP | 5142938 B | | 2/2013 |
| JP | 2013-204025 | | 10/2013 |
| WO | 2010119730 | | 10/2010 |
| WO | 2012/141413 | | 10/2012 |
| WO | WO-2013011828 A1 * | 1/2013 | ............... C08J 5/18 |
| WO | 2014002491 | | 1/2014 |
| WO | 2014162369 | | 10/2014 |

OTHER PUBLICATIONS

International Search Report issued in International Application No. PCT/JP2014/005855, Feb. 24, 2015, 3 pages.
International Preliminary Report on Patentability issued in International Application No. PCT/JP2014/005936, dated May 31, 2016, 8 pages.
International Search Report for PCT/JP2014/005936, dated Mar. 3, 2015, 5 pages including English translation.
International Preliminary Report on Patentability issued in International Application No. PCT/JP20141005935, dated May 31, 2016, 4 pages.
International Search Report for PCT/JP2014/005935, dated Mar. 3, 2015, 5 pages including English translation.
Office Action issued for Chinese Patent Application No. 201480063896.6, dated Feb. 3, 2017, 12 pages including partial English translation.
International Search Report dated Mar. 31, 2015, issued in International Application No. PCT/JP2014/083787, with English translation (5 pages).
Written Opinion of the International Searching Authority dated Mar. 31, 2015, issued in International Application No. PCT/JP2014/083787, with English translation (9 pages).
PCT International Preliminary Report on Patentability dated Jun. 28, 2016, by the International Bureau of WIPO in International Application No. PCT/JP2014/083787, with English translation (11 pages).
Yiding Shen, Light Chemical Additives, First Edition, China Light Industry Press, Jul. 31, 2004, p. 234 (with concise explanation of relevance in English).
Zhengjun Li, Leather Finishing Agent and Finishing Technology, First Edition, Chemical Industry Press, Jul. 31, 2002, p. 29 (with partial English machine translation).
Office Action issued for Chinese Patent Application No. 201480063894.7, dated Oct. 9, 2018, 10 pages (with English translation of Search Report).

* cited by examiner

RESIN MATERIAL AND FILM THEREOF

TECHNICAL FIELD

The present invention relates to a resin material and a film of the resin material.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens). Such resins are generally called "optical resins" or "optical polymers".

Birefringence is one of important optical characteristics that should be taken into consideration when optical resins are used to form optical members. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

Orientation birefringence generally develops when main chains of a chain-like polymer (polymer chains) are oriented, and this orientation of main chains occurs in a process involving the flowing of a material, such as an extrusion-molding or stretching process during production of a polymer film or an injection molding process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

On the other hand, photoelastic birefringence is caused by elastic deformation (distortion) of a polymer. In the case of an optical member using a polymer, elastic deformation (distortion) occurs and remains in its material due to, for example, volume contraction caused by cooling from a temperature around the glass transition temperature of the polymer to a temperature lower than that, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ when a birefringence difference $\Delta n$ is caused by a stress difference $\Delta\sigma$.

$$\Delta n = \gamma \Delta \sigma$$

Hereinafter, the phrase "photoelastic birefringence is positive" means that a refractive index is large in a direction parallel to a direction in which tensile stress is applied (direction in which polymer chains are oriented), and the phrase "photoelastic birefringence is negative" means that a refractive index is large in a direction orthogonal to a direction in which tensile stress is applied.

There are various reports about suppression of the above-described birefringence.

For example, Patent Document 1 discloses a non-birefringent optical resin material obtained by blending two polymer resins that are opposite in the sign of orientation birefringence to each other and are completely miscible. However, it is difficult to uniformly mix the two polymer resins described in Patent Document 1 to obtain a practical polymer resin that uniformly exhibits low orientation birefringence as a whole, and aggregates of the polymer resins may cause foreign matter defects. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence. Further, the mechanical strength, especially impact resistance, of the optical resin material is not always sufficient, which causes a problem such as cracking when the optical resin material is practically used.

Patent Document 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5,000 or less, and a resulting molded body has excellent transparency. However, there is no description about improvement in photoelastic birefringence or mechanical strength. Further, there is a case where heat resistance is reduced.

Patent Document 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength.

Patent Document 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, the composition of the optical resin material is limited to some extent to make it possible to cancel out both orientation birefringence and photoelastic birefringence at the same time, and therefore the glass transition temperature of the optical resin material is as low as less than 100° C. and there is a problem such as a reduction in mechanical strength. Further, there may be a problem that polymer decomposition occurs during molding performed under such conditions that the optical resin material is retained at high temperature, such as melt-extrusion molding for forming film.

The optical resin materials of Patent Documents 1 to 4 improve the birefringence but has problems in practical use as described above. For the purpose of providing a practical optical resin material, improvements of the mechanical strength and heat resistance of the optical resin material have been studied.

For example, Patent Document 5 discloses a method for obtaining a resin composition, which has high heat resistance and exhibits excellent mechanical strength, especially bending resistance, when formed into a film, and an optical film. The resin composition is obtained by using, in combination, an acrylic resin having a glass transition temperature of 120° C. or higher and a graft copolymer obtained by graft copolymerization of a vinyl-based polymerizable monomer to an acrylic rubber-like polymer ("core-shell"-type impact resistance improver, hereinafter also referred to as "core-shell polymer"). The graft copolymer is added for the improvement of the mechanical strength. However, an improvement of birefringence such as orientation birefringence or photoelastic birefringence has not been studied.

Patent Document 6 discloses an optical film obtained by molding a resin composition containing an acrylic resin (A) and an acrylic rubber (B). The acrylic resin (A) is a heat-resistant acrylic resin (A-1) containing a repeating unit derived from a methacrylate monomer, a repeating unit derived from a vinyl aromatic monomer, a repeating unit derived from a methacrylate monomer having an aromatic group, and a cyclic acid anhydride repeating unit. This document states that the optical film has high heat resistance and excellent trimming property and has excellent optical characteristics even when stretched. The graft copolymer (core-shell polymer) that is the acrylic rubber (B) is added to improve mechanical strength while maintaining transparency such as haze. It should be noted that the orientation birefringences of the optical films of Examples to which the acrylic rubber (B) is added are higher than those of optical films of Comparative Examples using only the acrylic resin (A), and the photoelastic constants (photoelastic birefringences) of the optical films of Examples are equal to those of the optical films of Comparative Examples using only the acrylic resin (A).

CITATION LIST

Patent Literature

Patent Document 1: U.S. Pat. No. 4,373,065
Patent Document 2: Japanese Patent No. 3696649
Patent Document 3: Japanese Patent NO. 3648201
Patent Document 4: Japanese Patent No. 4624845
Patent Document 5: JP-A-2009-203348
Patent Document 6: Japanese Patent No. 5142938

SUMMARY OF INVENTION

Technical Problem

As described above, the acrylic rubber is added for the improvement of the mechanical property. However, the addition of the acrylic rubber deteriorates the heat stability of a heat-resistant acrylic resin. During long-time production in a film manufacturing process, especially during filtration using a polymer filter for removal of foreign matters, the resin may stay in the polymer filter for a long period of time at high temperature. Under such a harsh environment, the resin composition whose heat stability is deteriorated tends to cause thermal decomposition, and therefore, the deterioration of the resin is a concern.

The obtained film is subjected to a secondary treatment such as primer coating or hard coating in some cases. The surface of the film may be eroded by an organic solvent used in the secondary treatment, and this may cause poor appearance such as surface unevenness or creases. Especially, the acrylic resin and a resin having an aromatic ring structure are weak against the organic solvent such as methyl ethyl ketone, and the risk of occurrence of the above trouble is high.

Further, it is generally difficult to improve the appearance of the acrylic resin film containing the acrylic rubber over a wide treatment range. Depending on the compositions of the acrylic resin and the acrylic rubber and molding conditions, film surface unevenness may occur, and variations in film thickness may increase.

An object of the present invention is to provide a resin material having high transparency, few foreign matter defects, high heat stability, high solvent resistance, excellent surface appearance, and excellent mechanical strength, and a film made of the resin material.

Solution to Problem

The present inventors have diligently studied in consideration of the above circumstances. As a result, the present inventors have found that the resin material can obtain both the mechanical strength and the heat stability and further obtain the solvent resistance in such a manner that a polymer layer containing a specific monomer component is included in a multi-layered graft copolymer dispersed in a thermoplastic resin. Thus, the present invention was made.

To be specific, the present invention is as below.

[1] A resin material including: a thermoplastic resin (A); and a polymer (B) satisfying following conditions, wherein: the polymer (B) is a graft copolymer obtained by multistep polymerization; and at least one step of the multistep polymerization is polymerization of a monomer mixture containing a monomer represented by a formula (4) and (meth)acrylic acid and/or its salt,

[Chemical Formula 1]

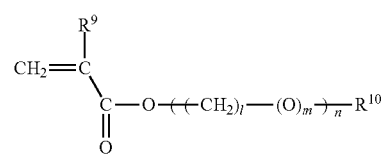

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

[2] The resin material according to [1], wherein a polymer of the monomer mixture is a hard polymer.

[3] The resin material according to [1] or [2], wherein the monomer mixture contains: 1 to 99.9 wt. % of the monomer represented by the formula (4); 0.1 to 30 wt. % of the (meth)acrylic acid and/or its salt; 98.9 to 0 wt. % of another monomer copolymerizable with the monomer represented by the formula (4) and the (meth)acrylic acid and/or its salt; and 0 to 2.0 parts by weight of a polyfunctional monomer (per 100 parts by weight of a total amount of the monomer represented by the formula (4), the (meth)acrylic acid and/or its salt, and the another monomer copolymerizable with the monomer represented by the formula (4) and the (meth)acrylic acid and/or its salt).

[4] The resin material according to any one of [1] to [3], wherein the graft copolymer has a cross-linked structure.

[5] The resin material according to any one of [1] to [4], wherein the graft copolymer has a cross-linked structure constituted by a (meth)acrylic cross-linked polymer.

[6] The resin material according to [4] or [5], wherein the cross-linked structure is formed by polymerization of: 50 to 100 wt. % of acrylic ester; 50 to 0 wt. % of another monomer copolymerizable with the acrylic ester; and 0.05 to 10 parts by weight of a polyfunctional monomer (per 100 parts by weight of a total amount of the acrylic ester and the another monomer copolymerizable with the acrylic ester).

[7] The resin material according to any one of [1] to [6], wherein the graft copolymer is formed by: (B-1) performing polymerization of a monomer mixture of 50 to 100 wt. % of acrylic ester, 50 to 0 wt. % of another monomer copolymerizable with the acrylic ester, and 0.05 to 10 parts by weight of a polyfunctional monomer (per 100 parts by weight of a total amount of the acrylic ester and the another monomer copolymerizable with the acrylic ester) to obtain a (meth)acrylic cross-linked structure-containing polymer; and (B-1) in a presence of the (meth)acrylic cross-linked structure-containing polymer, performing polymerization of the monomer mixture containing the monomer represented by the formula (4) and the (meth)acrylic acid and/or its salt.

[8] The resin material according to any one of [4] to [7], wherein a volume-average particle diameter to the cross-linked structure is 20 to 450 nm.

[9] The resin material according to any one of [4] to [8], wherein a content of the cross-linked structure is 1 to 60 parts by weight with respect to 100 parts by weight of the resin material.

[10] A resin material including: a thermoplastic resin (A); and a polymer (B) satisfying following conditions, wherein: the polymer (B) is a multi-layered graft copolymer; and at least one layer of a multi-layered structure of the multi-layered graft copolymer is a polymer layer containing a monomer structural unit represented by a formula (4) and a structural unit of (meth)acrylic acid and/or its salt,

[Chemical Formula 2]

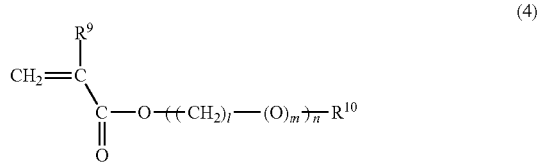

(4)

wherein $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

[11] The resin material according to [10], wherein the polymer layer is a hard polymer layer.

[12] The resin material according to [10] or [11], wherein the polymer layer is formed by a monomer mixture containing: 1 to 99.9 wt. % of a monomer represented by the formula (4); 0.1 to 30 wt. % of the (meth)acrylic acid and/or its salt; 98.9 to 0 wt. % of another monomer copolymerizable with the monomer represented by the formula (4) and the (meth)acrylic acid and/or its salt; and 0 to 2.0 parts by weight of a polyfunctional monomer (per 100 parts by weight of a total amount of the monomer represented by the formula (4), the (meth)acrylic acid and/or its salt, and the another monomer copolymerizable with the monomer represented by the formula (4) and the (meth)acrylic acid and/or its salt).

[13] The resin material according to any one of [10] to [12], wherein the multi-layered graft copolymer includes a cross-linked polymer layer.

[14] The resin material according to any one of [10] to [13], wherein the multi-layered graft copolymer includes a (meth)acrylic cross-linked polymer layer.

[15] The resin material according to [13] or [14], wherein the cross-linked polymer layer is formed by polymerization of 50 to 100 wt. % of acrylic ester, 50 to 0 wt. % of another monomer copolymerizable with the acrylic ester, and 0.05 to 10 parts by weight of a polyfunctional monomer (per 100 parts by weight of a total amount of the acrylic ester and the another monomer copolymerizable with the acrylic ester).

[16] The resin material according to any one of [10] to [15], wherein the multi-layered graft copolymer is formed by: (B-1) performing polymerization of a monomer mixture of 50 to 100 wt. % of acrylic ester, 50 to 0 wt. % of another monomer copolymerizable with the acrylic ester, and 0.05 to 10 parts by weight of a polyfunctional monomer (per 100 parts by weight of a total amount of the acrylic ester and the another monomer copolymerizable with the acrylic ester) to obtain a (meth)acrylic cross-linked polymer layer; and (B-2) in a presence of a polymer containing the (meth)acrylic cross-linked polymer layer, performing polymerization of a monomer mixture containing a monomer represented by the formula (4) and the (meth)acrylic acid and/or its salt to obtain a layer.

[17] The resin material according to any one of [13] to [16], wherein a volume-average particle diameter to the cross-linked polymer layer is 20 to 450 nm.

[18] The resin material according to any one of [13] to [17], wherein a content of the cross-linked polymer is 1 to 60 parts by weight with respect to 100 parts by weight of the resin material.

[19] The resin material according to any one of [1] to [18], wherein the monomer represented by the formula (4) is at least one selected from the group consisting of benzil (meth)acrylate, dicyclopentanyl (meth)acrylate, and phenoxyethyl (meth)acrylate.

[20] The resin material according to any one of [1] to [19], wherein the thermoplastic resin (A) is an acrylic resin.

[21] The resin material according to any one of [1] to [20], wherein the thermoplastic resin (A) has a glass transition temperature of not less than 100° C.

[22] The resin material according to any one of [1] to [21], wherein an acid value of the thermoplastic resin (A) is 0.01 to 5 mmol/g.

[23] The resin material according to any one of [1] to [22], wherein the thermoplastic resin (A) contains at least one selected from the group consisting of: a glutarimide acrylic resin; a lactone ring-containing acrylic polymer; a partially-hydrogenated styrene-based polymer obtained by partial hydrogenation of aromatic rings of a styrene-based polymer obtained by polymerization of a styrene monomer and another monomer copolymerizable with the styrene monomer; an acrylic polymer containing a cyclic acid anhydride repeating unit; an acrylic resin copolymerized with an N-substituted maleimide compound as a copolymerization component; and a hydroxyl group- and/or carboxyl group-containing acrylic polymer.

[24] The resin material according to any one of [1] to [23], wherein the thermoplastic resin (A) contains a glutarimide acrylic resin including a unit represented by a following general formula (1) and a unit represented by a following general formula (2),

[Chemical Formula 3]

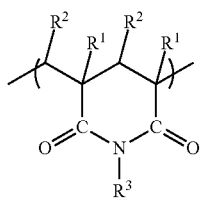

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms,

[Chemical Formula 4]

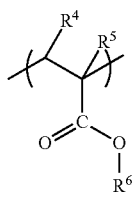

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

[25] The resin material according to [24], wherein the glutarimide acrylic resin does not contain a unit represented by a following general formula (3),

[Chemical Formula 5]

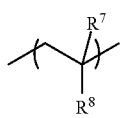

(3)

wherein $R^7$ is hydrogen or an alkyl group having 1 to 8 carbon atoms and $R^8$ is an aryl group having 6 to 10 carbon atoms.

[26] The resin material according to any one of [1] to [25], wherein a 1% weight reduction temperature of the resin material is not less than 290° C.

[27] The resin material according to any one of [1] to [26], wherein a tensile elongation at breakage of the resin material is not less than 10%.

[28] The resin material according to any one of [1] to [27], wherein a photoelastic constant of the thermoplastic resin (A) and a photoelastic constant of the polymer (B) are different in sign from each other.

[29] The resin material according to any one of [1] to [28], wherein an orientation birefringence of the resin material is $-1.7 \times 10^{-4}$ to $1.7 \times 10^{-4}$.

[30] The resin material according to any one of [1] to [29], wherein a photoelastic constant of the resin material is $-4 \times 10^{-12}$ to $4 \times 10^{-12}$ $Pa^{-1}$.

[31] The resin material according to any one of [1] to [30], further including birefringent inorganic microparticles.

[32] The resin material according to any one of [1] to [31], further including a birefringent low-molecular compound.

[33] A molded body formed by the resin material according to any one of [1] to [32].

[34] A film formed by the resin material according to any one of [1] to [32].

[35] A film formed by melt extrusion of the resin material according to any one of [1] to [32].

[36] The film according to [34] or [35], wherein the film is an optical film.

[37] The film according to any one of [34] to [36], wherein the film has a thickness of 10 to 500 μm.

[38] The film according to any one of [34] to [37], wherein an orientation birefringence of the film is $-1.7 \times 10^{-4}$ to $1.7 \times 10^{-4}$.

[39] The film according to any one of [34] to [38], wherein a photoelastic constant of the film is $-4 \times 10^{-12}$ to $4 \times 10^{-12}$ $Pa^{-1}$.

[40] The film according to any one of [34] to [39], wherein a tensile elongation at breakage of the film is not less than 10%.

[42] The resin material according to any one of [1] to [32], wherein a polymer formed by the polymerization of the monomer mixture containing the monomer represented by the formula (4) and the (meth)acrylic acid and/or its salt in the polymer (B) includes: a structural unit containing carboxyl group and/or its salt; and/or an acid anhydride structure.

[43] A multi-layered graft copolymer including: a (B-1) layer that is a cross-linked polymer layer; and a (B-2) layer that is a layer formed by polymerization of a monomer mixture containing a monomer represented by the above formula (4) and (meth)acrylic acid and/or its salt.

[44] The multi-layered graft copolymer according to [43], wherein the (B-2) layer is formed by polymerization of 1 to 99.9 wt. % of the monomer represented by the formula (4), 0.1 to 30 wt. % of the (meth)acrylic acid and/or its salt, 98.9 to 0 wt. % of another monomer copolymerizable with the monomer represented by the formula (4) and the (meth)acrylic acid and/or its salt, and 0 to 2.0 parts by weight of a polyfunctional monomer (per 100 parts by weight of a total amount of the monomer represented by the formula (4), the (meth)acrylic acid and/or its salt, and the another monomer copolymerizable with the monomer represented by the formula (4) and the (meth)acrylic acid and/or its salt).

[45] The multi-layered graft copolymer according to [43] or [44], wherein the (B-1) cross-linked polymer layer is at least one selected from the group consisting of a butadiene cross-linked polymer layer, a (meth)acrylic cross-linked polymer layer, and an organosiloxane cross-linked polymer layer.

[46] The multi-layered graft copolymer according to any one of [43] to [45], wherein at least one layer included in the (B-1) layer that is the cross-linked polymer layer is a (meth)acrylic cross-linked polymer layer obtained by polymerization of a monomer mixture of 50 to 100 wt. % of acrylic ester, 50 to 0 wt. % of another monomer copolymerizable with the acrylic ester, and 0.05 to 10 parts by weight of a polyfunctional monomer (per 100 parts by weight of a total amount of the acrylic ester and the another monomer copolymerizable with the acrylic ester).

[47] The multi-layered graft copolymer according to any one of [43] to [46], wherein a volume-average particle diameter to the (B-1) layer that is the cross-linked polymer layer is 20 to 450 nm.

[48] The multi-layered graft copolymer according to any one of [43] to [47], wherein the monomer represented by the formula (4) is at least one selected from the group consisting of benzil (meth)acrylate, dicyclopentanyl (meth)acrylate, and phenoxyethyl (meth)acrylate.

[49] The multi-layered graft copolymer according to any one of [43] to [48], wherein a graft ratio of the multi-layered graft copolymer is 10 to 250 wt. %.

[50] The multi-layered graft copolymer according to any one of [43] to [49], wherein the (B-1) layer that is the cross-linked polymer layer is 10 to 90 wt. % with respect to 100 wt. % of the multi-layered graft copolymer.

[5] The multi-layered graft copolymer according to any one of [43] to [50], wherein: the (B-1) layer that is the cross-linked polymer layer is an inner layer; and the (B-2) layer is an outer layer.

[52] The multi-layered graft copolymer according to [51], further including a hard polymer layer as an innermost layer.

[53] The resin material according to any one of [43] to [52], wherein the (B-2) layer includes: a structural unit containing carboxyl group and/or its salt; and/or an acid anhydride structure.

[54] A molded body including: a thermoplastic resin; and a multi-layered graft copolymer, wherein: the multi-layered graft copolymer includes a polymer layer containing a monomer structural unit represented by the above formula (4) and a glutaric anhydride structural unit, Advantageous Effects of Invention The resin material of the present invention can provide a molded body having high transparency, few foreign matter defects, high heat stability, high solvent resistance, excellent surface appearance, and excellent mechanical strength.

DESCRIPTION OF EMBODIMENTS

Hereinbelow, embodiments of the present invention will be described in detail, but the present invention is not limited to these embodiments.

A resin material according to the present invention and a film thereof contain, as essential components, a thermoplastic resin (A) as a matrix component and a polymer (B).

(Thermoplastic Resin (A))

In the present invention, the thermoplastic resin (A) is not limited as long as it is a typical thermoplastic resin. However, it is preferable that the thermoplastic resin (A) be a thermoplastic resin (A) having transparency. Specific examples of the resin (A) include a wide variety of transparent thermoplastic resins such as polycarbonate resins typified by bisphenol A polycarbonate; aromatic vinyl-based resins and hydrogenated products thereof such as polystyrene, styrene-acrylonitrile copolymers, styrene-maleic anhydride resins, styrene-maleimide resins, styrene-(meth) acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as polymethylmethacrylate and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase such as polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins such as triacetylcellulose resins; and polyphenylene oxide resins. In consideration of practical use, the thermoplastic resin is preferably selected so that a resulting molded body (having a thickness of 125 μm) has a total light transmittance of preferably 85% or higher, more preferably 90% or higher, further preferably 92% or higher. Specifically, it is preferable to select the thermoplastic resin having the total light transmittance of 85% or more, more preferably 90% or more, and further preferably 92% or more when the thickness is 125 μm.

Among these thermoplastic resins, acrylic resins are particularly preferred for their excellent optical characteristics, heat resistance, and molding processability. Specifically, the orientation birefringence and photoelastic birefringence of the acrylic resin can be made low, and in addition, the acrylic resin can have practical properties such as the heat resistance, the solvent resistance, and the mechanical property. The acrylic resin may be a resin formed by polymerization of a vinyl-based monomer containing (meth)acrylic ester. Examples of the acrylic resin include an acrylic resin obtained by polymerization of 30 to 100 wt. % of methyl methacrylate and 70 to 0 wt. % of a monomer copolymerizable therewith.

A preferred example of another vinyl-based monomer copolymerizable with methyl methacrylate is (meth)acrylic ester (except for methyl methacrylate) whose alkyl residue has 1 to 10 carbon atoms. Specific examples of such another vinyl-based monomer copolymerizable with methyl methacrylate include: methacrylic esters such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylic esters such as methyl acrylate, ethyl acrylate, butyl acrylate, 2-ethylhexyl acrylate, glycidyl acrylate, epoxycyclohexylmethyl acrylate, 2-hydroxyethyl acrylate, 2-hydroxypropyl acrylate; carboxylic acids such as methacrylic acid and acrylic acid and esters thereof; vinyl cyanides such as acrylonitrile and methacrylonitrile; vinyl arenes such as styrene, α-methyl styrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl-based monomers may be used singly or in combination of two or more of them.

From the viewpoint of the transparency, appearance, and the like specific to the acrylic resin, the acrylic resin contains methyl methacrylate in an amount of preferably 30 to 100 wt. %, more preferably 50 to 99.9 wt. %, further preferably 50 to 98 wt. % and the monomer copolymerizable with methyl methacrylate in an amount of preferably 70 to 0 wt. %, more preferably 50 to 0.1 wt. %, further preferably 50 to 2 wt. %. If the methyl methacrylate content is less than 30 wt. %, optical characteristics, appearance, weather resistance, and heat resistance specific to acrylic resins tend to be degraded. From the viewpoint of processability and appearance, it is preferred that a polyfunctional monomer is not used.

From the viewpoint of miscibility with the polymer (B) of the present invention, the thermoplastic resin (A) used in the present invention is preferably a resin having an acid group or a resin having a cyclic structure (such as an anhydrous cyclic structure). For example, the acid value of the thermoplastic resin is preferably 0.01 to 5 mmol/g, more preferably 0.01 to 3.5 mmol/g, further preferably 0.01 to 2.5 mmol/g, yet further preferably 0.01 to 1.5 mmol/g, and especially preferably 0.01 to 1 mmol/g. It should be noted that the acid value can be calculated by, for example, a titration method described in JP-A-2005-23272.

The glass transition temperature of the thermoplastic resin (A) used in the present invention can be set according to use conditions and intended use, but is preferably 100° C. or higher, more preferably 110° C. or higher, even more preferably 115° C. or higher, most preferably 120° C. or higher.

A specific example of an acrylic resin having a glass transition temperature of 100° C. or higher is an acrylic resin containing a glutarimide structure, a glutaric anhydride structure, a (meth)acrylic acid unit, a structural unit derived from a N-substituted maleimide compound, or a lactone ring in its molecule. Examples of such an acrylic resin include glutarimide acrylic resins, glutaric anhydride acrylic resins, lactone ring-containing acrylic resins, hydroxyl group- and/or carboxyl group-containing acrylic resins, methacrylic resins, acrylic polymer containing a cyclic acid anhydride repeating unit, and acrylic resin copolymerized with an N-substituted maleimide compound as a copolymerization component. Examples of the N-substituted maleimide compound include N-phenylmaleimide, N-benzylmaleimide, N-(2,4,6-tribromophenyl)maleimide, N-cyclohexylmaleimide, N-methylmaleimide, N-ethylmaleimide, and N-isopropylmaleimide. Further, in the acrylic resin copolymerized with the N-substituted maleimide compound as the copolymerization component, aromatic vinyl such as styrene may be copolymerized as the copolymerization component. Examples of another usable resin having a glass transition temperature of 100° C. or higher include partially-hydrogenated styrene-based polymers obtained by partial hydrogenation of aromatic rings of a styrene-based polymer obtained by polymerization of a styrene monomer and another monomer copolymerizable therewith, polymers containing a cyclic acid anhydride repeating unit, polyethylene terephthalate resins, and polybutylene terephthalate resins. A heat-resistant acrylic resin is preferable. This is because since the heat-resistant acrylic resin has excellent miscibility with the polymer (B), a film having extremely excellent appearance can be obtained. Specific examples include glutarimide acrylic resins, glutaric anhydride acrylic resins, lactone ring-containing acrylic resins, hydroxyl group- and/or carboxyl group-containing acrylic resins, methacrylic resins, acrylic polymer containing a cyclic acid anhydride repeating unit, and acrylic resin copolymerized with an N-substituted maleimide compound as a copolymerization component. Among them, a glutarimide acrylic resin that will be described below is particularly preferably used because a resulting film has improved heat resistance and also has excellent optical characteristics when stretched.

(Glutarimide Acrylic Resin)

It is preferable that the glutarimide acrylic resin contain a unit represented by the following general formula (1) and a unit represented by the following general formula (2).

[Chemical Formula 6]

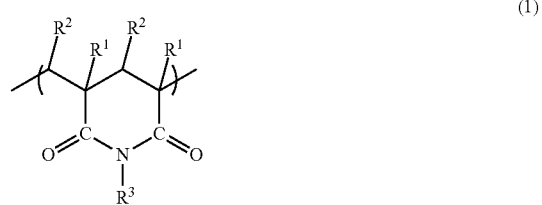

(1)

In the formula (1), $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylic ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α, β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin is not particularly limited, and can be appropriately determined in consideration of, for example, the structure of $R^3$. However, the glutarimide unit content is preferably 1.0 wt. % or more, more preferably 3.0 wt. % to 90 wt. %, even more preferably 5.0 wt. % to 60 wt. % with respect to the total weight of the glutarimide acrylic resin. If the glutarimide unit content is less than the above lower limit, a resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a resulting film when the film is processed, or impair transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt. %) using the molecular weight of each monomer unit.

For example, when the resin is composed of a glutarimide unit whose $R^3$ in the above general formula (1) is a methyl group and a methyl methacrylate unit, a glutarimide unit content (wt. %) can be determined from the following calculation formula using the area a of a peak derived from protons of O—CH$_3$ of methyl methacrylate and appearing at about 3.5 to 3.8 ppm and the area b of a peak derived from protons of N—CH$_3$ of glutarimide and appearing at about 3.0 to 3.3 ppm.

[Methyl methacrylate unit content $A$(mol %)]= 100×$a$/($a$+$b$)

[Glutarimide unit content $B$(mol %)]=100×$b$/($a$+$b$)

[Glutarimide unit content (wt. %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt. %) can be determined in the same manner as described above from the amount (mol %) of each monomer unit contained in the resin and the molecular weight of each monomer unit.

When the resin material according to the present invention is used for, for example, a polarizer protective film, the glutarimide unit content is preferably 20 wt. % or less, more preferably 15 wt. % or less, even more preferably 10 wt. % or less because birefringence is more likely to be suppressed.

[Chemical Formula 7]

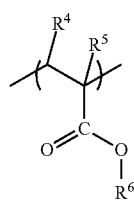

(2)

In the general formula (2), $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylic ester unit". It is to be noted that in this specification, "(meth)acryl" refers to "methacryl or acryl".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylic ester unit or two or more kinds of (meth)acrylate units between which any one of $R^4$, $R^5$, and $R^6$ in the above general formula (2) is different or all of them are different.

If necessary, the glutarimide acrylic resin may further contain a unit represented by the following general formula (3) (hereinafter, also referred to as "aromatic vinyl unit"):

[Chemical Formula 8]

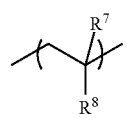

(3)

In the general formula (3), $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methyl styrene unit. The aromatic vinyl unit is preferably a styrene unit.

The glutarimide acrylic resin may contain only one kind of aromatic vinyl unit or two or more kinds of aromatic vinyl units between which one of $R^7$ and $R^8$ is different or both of them are different.

The aromatic vinyl unit content of the glutarimide acrylic resin is not particularly limited, but is preferably 0 to 50 wt. %, more preferably 0 to 20 wt. %, particularly preferably 0 to 15 wt. % with respect to the total weight of the glutarimide acrylic resin. If the aromatic vinyl unit content exceeds the above upper limit, the glutarimide acrylic resin cannot have sufficient heat resistance.

However, in the present invention, the glutarimide acrylic resin preferably contains no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylic ester unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexylmaleimide.

The another unit may be incorporated into the glutarimide acrylic resin by random copolymerization or graft copolymerization.

The another unit may be incorporated by copolymerization of a monomer constituting the another unit with the glutarimide acrylic resin and/or a resin as a raw material for producing the glutarimide acrylic resin. Alternatively, the another unit incorporated into the glutarimide acrylic resin may be a by-product of the above-described imidization reaction.

The weight-average molecular weight of the glutarimide acrylic resin is not particularly limited, but is preferably in the range of 1×10$^4$ to 5×10$^5$. By setting the weight-average molecular weight of the glutarimide acrylic resin to a value within the above range, it is possible to prevent deterioration of molding processability or to prevent a resulting film from having poor mechanical strength when the film is processed.

If the weight-average molecular weight is less than the above lower limit, a resulting film tends to have poor mechanical strength. On the other hand if the weight-average molecular weight exceeds the above upper limit, viscosity during melt extrusion tends to be high, molding processability tends to be deteriorated, and molded body productivity tends to be reduced.

The glass transition temperature of the glutarimide acrylic resin is preferably 120° C. or higher so that a resulting film can have excellent heat resistance. More preferably, the glass transition temperature of the glutarimide acrylic resin is 125° C. or higher. If the glass transition temperature of the glutarimide acrylic resin is lower than the above lower limit, a resulting film cannot have sufficient heat resistance.

Hereinbelow, one example of a method for producing the glutarimide acrylic resin will be described.

First, a (meth)acrylic ester polymer is produced by polymerization of (meth)acrylic ester. When the glutarimide acrylic resin contains an aromatic vinyl unit, a (meth)acrylic ester-aromatic vinyl copolymer is produced by copolymerization of (meth)acrylic ester and an aromatic vinyl compound.

The (meth)acrylic ester used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylic esters may be used singly or in combination of two or more of them. The use of two or more kinds of (meth)acrylic esters makes it possible to finally obtain a glutarimide acrylic resin containing two or more kinds of (meth)acrylic ester units.

The structure of the (meth)acrylic ester polymer or the (meth)acrylic ester-aromatic vinyl copolymer is not particularly limited as long as a subsequent imidization reaction can be performed. More specifically, the (meth)acrylate polymer or the (meth)acrylate-aromatic vinyl copolymer may be a linear polymer, a block polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer.

Then, the (meth)acrylic ester polymer or the (meth)acrylic ester-aromatic vinyl copolymer is reacted with an imidization agent to perform an imidization reaction. In this way, a glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded body productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane) phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylic ester polymer or the (meth) acrylic ester-aromatic vinyl polymer. By setting the amount of the esterification agent to be used to a value within the above range, it is possible to adjust the acid value of the glutarimide acrylic resin to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Example of a batch-type reactor having such a structure include a mixing vessel MAX BLEND manufactured by Sumitomo Heavy Industries, Ltd. and the like.

In such a way as described above, the glutarimide acrylic resin whose glutarimide unit content is controlled to a specific value can be easily produced.

In the resin material of the present invention, only one kind of thermoplastic resin (A) may be used, or two or more kinds of thermoplastic resins may be used in combination. A method of blending two or more kinds of thermoplastic resins is not especially limited, and a known method may be used.

(Polymer (B))

The polymer (B) used in the present invention is a multi-layered graft copolymer. At least one layer in a multi-layered structure of the multi-layered graft copolymer is formed by polymerization of a monomer mixture containing: a monomer represented by the following formula (4); and (meth)acrylic acid and/or its salt.

[Chemical Formula 9]

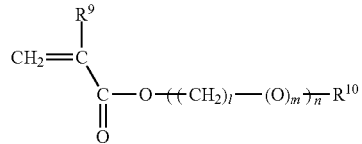

(4)

In the formula (4), $R^9$ is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure, l is an integer of 1 to 4, m is an integer of 0 or 1, and n is an integer of 0 to 10.

It is preferable that the polymer (B) of the present invention include at least one hard polymer layer. By including the hard polymer layer in the polymer (B), (i) the polymer (B) can be uniformly dispersed in the matrix (thermoplastic resin (A)), and (ii) as described below, the birefringence of the thermoplastic resin (A) can be canceled out, and therefore, the optical isotropy of the resin material and film of the present invention can be improved. The term "hard" used herein means that the glass transition temperature of the polymer is 20° C. or higher. It is preferable that the polymer (B) of the present invention include as the hard polymer layer a layer formed by polymerization of the above monomer mixture. The polymer (B) of the present invention may further include another hard polymer layer. To be specific, it is preferable that the layer formed by polymerization of the above monomer mixture be the hard polymer layer. If the glass transition temperature of the polymer is lower than 20° C., the resin material and the film that contain the polymer (B) have low heat resistance or there may be a problem that coarsening or agglomeration of the polymer (B) is likely to occur during production of the polymer (B).

(Monomer Represented by the Formula (4))

The monomer represented by the following formula (4) is used in the polymer (B) of the present invention.

[Chemical Formula 10]

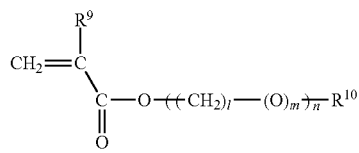

(4)

In the formula (4), $R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure. A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), l is an integer of 1 to 4, preferably an integer of 1 or 2, m is an integer of 0 or 1, and n is an integer of 0 to 10, preferably an integer of 0 to 2, more preferably an integer of 0 or 1.

The monomer represented by the formula (4) is preferably a (meth)acrylate-based monomer represented by the formula (4) wherein $R^9$ is a substituted or unsubstituted linear or branched alkyl group having 1 carbon atom, and is more preferably a (meth)acrylate-based monomer represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

A (meth)acrylate-based monomer represented by the formula (4) wherein l is an integer of 1 or 2 and n is an integer of 0 to 2 is more preferred.

Specific examples of the monomer represented by the formula (4) are as below. That is, examples of the monomer having an alicyclic structure include dicyclopentanyl (meth)acrylate and dicyclopentenyloxyethyl (meth)acrylate. Examples of the monomer having an aromatic group include benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth)acrylate.

Among the monomers represented by the formula (4), benzyl (meth)acrylate, dicyclopentanyl (meth)acrylate, and phenoxyethyl (meth)acrylate are preferred from the viewpoint of heat resistance, photoelastic birefringence, and miscibility.

Among these monomers represented by the formula (4), benzyl (meth)acrylate is most preferred in terms of optical isotropy, miscibility with the thermoplastic resin (A), and moldability. Further, benzyl methacrylate has a higher glass transition temperature and is therefore more preferred in terms of heat resistance. For example, when the thermoplastic resin (A) is an acrylic resin, the resin thermoplastic (A) has a negative photoelastic constant, and therefore the use of benzyl methacrylate having a relatively large positive photoelastic constant has merits that the amount of benzyl methacrylate to be used can be reduced or the amount of the polymer (B) to be used can be reduced and that the degree of freedom of design of the resin material can be increased. Although there is a case where high orientation birefringence of a molded body becomes a problem when the molded body is practically used, the orientation birefringence and photoelastic birefringence of benzyl methacrylate are both positive whereas the orientation birefringence and photoelastic birefringence of an acrylic resin are both negative, and therefore the orientation birefringence of the resin material or the film can be reduced while the photoelastic birefringence of the resin material or the film is also reduced.

When two or more kinds of thermoplastic resins are used in combination as the thermoplastic resin (A) of the present invention, the polymer (B) may be designed such that the photoelastic constant and/or orientation birefringence thereof are opposite in sign to the photoelastic constant and/or orientation birefringence of the thermoplastic resin made of two or more kinds of resins in combination.

From the viewpoint of achieving excellent dispersibility of the polymer (B) to reduce appearance defects such as fish-eyes while maintaining excellent optical isotropy, the amount of use of the monomer represented by the formula (4) is preferably 1 to 99.9 wt. %, more preferably 5 to 70 wt. %, and most preferably 5 to 50 wt. % (per 100 wt. % of the total amount of the monomer represented by the formula (4), (meth)acrylic acid and/or its salt, and another monomer copolymerizable therewith).

In the present invention, only one kind of monomer represented by the formula (4) may be used, or two or more types of monomers represented by the formula (4) may be used.

((Meth)acrylic Acid and/or its Salt)

In the polymer (B) of the present invention, the use of (meth)acrylic acid and/or its salt is essential. By using (meth)acrylic acid and/or its salt, the heat resistance of the polymer (B) itself is improved.

Examples of the salt of (meth)acrylic acid include sodium (meth)acrylate, calcium (meth)acrylate, magnesium (meth)acrylate, and ammonium (meth)acrylate. The amount of use of (meth)acrylic acid and/or its salt is preferably 0.1 to 30 wt. %, more preferably 0.1 to 20 wt. %, further preferably 0.1 to 15 wt. %, yet further preferably 0.1 to 10 wt. %, and most preferably 0.1 to 7 wt. % per 100 wt. % of the total amount of the monomer represented by the formula (4), (meth)acrylic acid and/or its salt, and another monomer copolymerizable therewith.

Since a (meth)acrylic acid structural unit exists in the polymer layer formed by polymerization of the above monomer mixture, a carboxyl group of the (meth)acrylic acid structural unit and an alkyl group of a (meth)acrylic acid derivative structural unit that exists next to the (meth)acrylic acid structural unit may be cyclized by removing alkyl alcohol during molding process (a heat treatment, such as heating, melting, and kneading of the thermoplastic resin (A) and the polymer (B)), and thus, an acid anhydride structure may be formed. For example, if methyl (meth)acrylate exists next to the (meth)acrylic acid, a methanol removal reaction may occur, and thus, a glutaric anhydride structure may be formed. Further, if benzil (meth)acrylate exists next to the (meth)acrylic acid, a benzyl alcohol removal reaction may occur, and thus, a glutaric anhydride structure may be formed.

If a (meth)acrylate salt structural unit exists in the polymer layer formed by polymerization of the above monomer mixture, the salt of the carboxyl group in the (meth)acrylate salt structural unit may be dissociated under a high temperature condition during molding processing to be a free carboxyl group. This carboxyl group and the alkyl group of the (meth)acrylic acid derivative structural unit may be cyclized, and thus, the acid anhydride structure may be formed.

Further, if the (meth)acrylic acid structural unit exists in the polymer layer formed by polymerization of the above monomer mixture, the carboxyl group of the (meth)acrylic acid structural unit may form a salt in a below-described salt coagulation treatment. Even in this case, when the salt of the carboxyl group is dissociated under a high temperature condition during molding processing to be a free carboxyl group, the acid anhydride structure may be formed.

When the carboxyl group and/or its salt contained in the polymer layer formed by polymerization of the monomer mixture becomes the acid anhydride structure as above, the following excellent effects are obtained.

(1) Heat stability during molding processing significantly improves.

Since the acid anhydride structure is included in the polymer (layer), zipping depolymerization of the polymer (layer) during molding processing can be suppressed, and the heat stability improves.

(2) The solvent resistance significantly improves.

Since the polymer (layer) includes the carboxyl group and/or the acid anhydride structure, the polarity of the polymer increases, and the heat resistance increases. With this, the solvent resistance improves, and especially the solvent resistance relative to an organic solvent such as methyl ethyl ketone improves. A typical acrylic film containing acrylic rubber is weak against an organic solvent such as a ketone solvent. Therefore, by penetration of the organic solvent used at the time of application of a coating layer such as a hard coat layer, an anti-reflection layer, a fingerprint-proof layer, a prism lens layer, or an adhesion layer, troubles such as film deformations, slack, creases, or break may be caused at the time of the application, conveyance, or drying.

(3) When the thermoplastic resin (A) is the heat-resistant acrylic resin, especially the heat-resistant acrylic resin containing a glutarimide group, the dispersibility of the polymer (B) significantly improves.

Since the polymer (layer) includes the carboxyl group and/or the acid anhydride structure, the miscibility between the heat-resistant acrylic resin and the polymer (B) improves, and therefore, the dispersibility of the polymer (B) improves. Especially when the thermoplastic resin (A) is the heat-resistant acrylic resin containing the glutarimide group, by an interaction among (i) the glutarimide group, especially the carboxyl group produced as a by-product at the time of glutarimide modification, (ii) the carboxyl group in the polymer (layer), and (iii) the acid anhydride structure in the polymer (layer), the miscibility between the thermoplastic resin (A) and the polymer (B) improves, and therefore, the dispersibility of the polymer (B) significantly improves. With this, for example, the surface property of the film becomes excellent. Even under a wide range of molding conditions and in a wide film thickness set range, the film having excellent appearance can be obtained. For example, the surface unevenness is not formed, and variations in film thickness in an MD direction are small. Thus, an increase in film defects caused due to progress of aggregation, crosslinking, degradation, or the like of rubber particles at a stay portion inside a filter can be suppressed, such increase becoming problematic when performing melt film formation while performing melting and filtration of a polymer material using, for example, a leaf disc filter. Further, nonuniformity and variations of melt viscosity due to the aggregation are effectively suppressed. Therefore, even under a wide range of film formation conditions or even in the case of performing film formation for a long period of time, the surface property of the film becomes excellent, and the film having the excellent appearance is easily obtained. For example, the foreign matter detects and the surface unevenness are not generated, and the variations in film thickness in the MD direction are small.

A rate at which the structural unit of the (meth)acrylic acid and/or its salt becomes the acid anhydride structure, that is, a cyclization rate changes depending on a thermal history such as a processing condition. The structural unit of the (meth)acrylic acid and/or its salt does not have to entirely become the acid anhydride structure. The cyclization rate may be adjusted arbitrarily depending on required characteristics. For example, the cyclization rate is preferably 5% or more, more preferably 50% or more, and further preferably 80% or more. The cyclization rate can be calculated by the following measurement method: 0.3 g of resin is dissolved in 37.5 mL of methylene chloride; 37.5 mL of methanol is further added; 5 mL of a 0.1 mmol % sodium hydroxide aqueous solution and some drops of an ethanol solution phenolphthalein are added; back titration is performed using 0.1 mmol % hydrochloric acid; an acid value of the resin is calculated based on the amount of hydrochloric acid required for neutralization; and the cyclization rate is calculated based on the acid values before and after processing.

Cyclization rate=(the acid value of the resin before the processing–the acid value of the resin after the processing)×100/(the acid value of the resin before the processing)

The resin material of the present invention may be produced such that the polymer (B) in which the carboxyl group and/or its salt derived from the (meth)acrylic acid and/or its salt is cyclized in advance by a heat treatment or the like into the acid anhydride structure is blended with the thermoplastic resin (A).

In addition to the monomer represented by the formula (4) and (meth)acrylic acid and/or its salt, the monomer mixture may contain another monomer copolymerizable with the monomer represented by the formula (4) and (meth)acrylic acid and its salt. The another monomer copolymerizable with the monomer represented by the above formula (4) and (meth)acrylic acid and its salt may be a monomer including one copolymerizable vinyl group, and one example thereof is methacrylic ester. From the viewpoint of polymerizability or cost, alkyl methacrylate is preferable. Specifically, the alkyl methacrylate is preferably one whose alkyl group has 1 to 12 carbon atoms, and the alkyl group may be either linear or branched. Specific examples of the alkyl methacrylate include methyl methacrylate, ethyl methacrylate, propyl methacrylate, butyl methacrylate, 2-ethylhexyl methacrylate, n-octyl methacrylate, β-hydroxyethyl methacrylate, dimethylaminoethyl methacrylate, and glycidyl methacrylate. Further, acrylic ester may also be preferably used. From the viewpoint of polymerization reactivity or cost, alkyl acrylate is preferable. Specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the copolymerizable monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; and (hydroxyalkyl)acrylic esters such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, alkyl methacrylates and alkyl acrylates are preferred. Further, methyl methacrylate is preferred from the viewpoint of miscibility with the acrylic resin, and methyl acrylate, ethyl acrylate, or n-butyl acrylate is preferred from the viewpoint of suppressing zipper depolymerization.

The above monomer mixture may contain a polyfunctional monomer having two or more non-conjugated reactive double bonds per molecule. Here, the polyfunctional monomer to be used may be the same as the polyfunctional monomer that can be used for a below-described cross-linked polymer layer. From the viewpoint of optical isotropy and dispersibility, the amount of the polyfunctional monomer to be used for the monomer mixture is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monomer represented by the above formula (4), (meth)acrylic acid and/or its salt, and the another monomer copolymerizable therewith).

According to the polymer (B) of the present invention, it is preferable that a hard polymer layer having, as the structural units, the monomer represented by the above formula (4) and (meth)acrylic acid and/or its salt be included in the multi-layered structure of the multi-layered graft copolymer. It is more preferable that when the polymer (B) has a hard outermost layer, a hard polymer layer having, as the structural units, the monomer represented by the above formula (4) and (meth)acrylic acid and/or its salt be included as the outermost layer. Similarly, it is preferable that in the graft copolymer obtained by multistep polymerization, the hard polymer formed by polymerization of the monomer mixture containing the monomer represented by the formula (4) and (meth)acrylic acid and/or its salt be grafted. It is more preferable that in a final step of the multistep polymerization, the hard polymer formed by polymerization of the monomer mixture containing the monomer represented by the formula (4) and (meth)acrylic acid and/or its salt be grafted. In addition to this hard polymer (layer), the polymer (B) of the present invention may include one or more other hard polymer layers. By allowing the polymer (B) to have a hard outermost layer, it is possible to allow the polymer (B) to be more miscible with the thermoplastic resin (A) when the thermoplastic resin (A) is acrylic resin, further reduce orientation birefringence and photoelastic constant, and easily obtain a film having excellent optical isotropy. A soft layer having a (meth)acrylic cross-linked polymer layer ((meth)acrylic rubber) may be adjacent to the inner side of the hard outermost layer.

It is preferable that the polymer (B) of the present invention include at least one cross-linked polymer layer.

The cross-linked polymer layer is not especially limited. Examples of the cross-linked polymer layer include a butadiene cross-linked polymer layer, a (meth)acrylic cross-linked polymer layer, and an organosiloxane cross-linked polymer layer. From the viewpoint of weather resistance and transparency, the (meth)acrylic cross-linked polymer layer is preferable.

The (meth)acrylic cross-linked polymer layer is preferably soft since the soft (meth)acrylic cross-linked polymer layer has excellent mechanical strength. The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

A (meth)acrylic cross-linked polymer is not particularly limited as long as it is a (meth)acrylic cross-linked polymer, but is preferably one obtained by polymerization of 50 to 100 wt. % of acrylic ester, 50 to 0 wt. % of the another monomer copolymerizable with the acrylic ester, and 0.05 to 10 parts by weight of a polyfunctional monomer (per 100 parts by weight of the total amount of the acrylic ester and the another monomer copolymerizable therewith) from the viewpoint of impact resistance such as crack resistance. All the monomer components may be mixed and polymerized by one step, or may be polymerized by two or more steps while changing the composition of monomers.

The acrylic ester is preferably alkyl acrylate from the viewpoint of polymerization reactivity and cost. Specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, β-hydroxyethyl acrylate, dimethylaminoethyl acrylate, and glycidyl acrylate, and these monomers may be used singly or in combination of two or more of them. The amount of the acrylic ester is preferably 50 to 100 wt. %, more preferably 60 to 100 wt. %, most preferably 70 to 100 wt. % with respect to the total amount of the monofunctional monomers (with respect to the total amount of the acrylic ester and the another monomer copolymerizable therewith). If the amount of the acrylic ester is less than 50 wt. %, there is a case where the crack resistance of the film is deteriorated.

The monomer copolymerizable with the acrylic ester (hereinafter, sometimes referred to as "copolymerizable monomer") may be a monomer including one copolymerizable vinyl group. One example of the monomer copolymerizable with the acrylic ester is methacrylic ester. From the viewpoint of polymerizability and cost, alkyl methacrylate is preferable. Specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. Other examples of the copolymerizable monomer include: vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The above described monofunctional monomer is copolymerized with the polyfunctional monomer having two or more non-conjugated reactive double bonds per molecule, and as a result, a cross-linked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight per 100 parts by weight of the total amount of the monofunctional monomers. If the amount of the polyfunctional monomer to be added is less than 0.05 part by weight, formation of a cross-linked polymer tends to be impossible. On the other hand, if the amount of the polyfunctional monomer to be added exceeds 10 parts by weight, the film tends to have low crack resistance.

It is preferable that the polymer (B) be a multi-layered polymer having at least one cross-linked polymer layer and at least one hard polymer layer, and the at least one hard polymer layer be a hard polymer layer having, as the structural units, the monomer represented by the formula (4) and (meth)acrylic acid and/or its salt. The number of layers in the polymer (B) is at least two, and an upper limit thereof is not especially limited. From the viewpoint of productivity, the number of layers in the polymer (B) is preferably not more than six. A preferred example of the polymer (B) is one that has a soft inner layer having a cross-linked polymer layer and a hard outer layer having a hard polymer layer having, as the structural units, a monomer represented by the above formula (4) and (meth)acrylic acid and/or its salt. This example is preferred from the viewpoint of productivity. Another preferred example of the polymer (B) is one that has a hard inner layer composed of at least one hard polymer layer, a soft intermediate layer having a soft polymer layer composed of a cross-linked polymer layer, and a hard outer layer having a hard polymer layer having, as the structural units, the monomer represented by the above formula (4) and (meth)acrylic acid and/or its salt. This example may further have a soft innermost layer. In the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the polymer (B) has a hard layer as an innermost layer, for example, when the polymer (B) has a multi-layered graft copolymer composed of a hard inner layer, a soft intermediate layer, and a hard outer layer, the innermost layer is preferably made of, for example, a hard polymer composed of 40 to 100 wt. % of methacrylic ester, 0 to 60 wt. % of acrylic ester, 0 to 60 wt. % of an aromatic vinyl-based monomer, 0 to 10 wt. % of a polyfunctional monomer, and 0 to 20 wt. % of a monomer copolymerizable with the methacrylic ester, the acrylic ester, and the aromatic vinyl-based monomer from the viewpoint of a balance between hardness and crack resistance.

When the polymer (B) has a multi-layered structure composed of, for example, a soft inner layer having a (meth)acrylic cross-linked polymer layer and a hard outer layer having a polymer layer having, as the structural units, the monomer represented by the above formula (4) and (meth)acrylic acid and/or its salt, a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other examples of the multi-layered graft copolymer.

The volume-average particle diameter to the cross-linked polymer layer of the polymer (B) is preferably 20 to 450 nm, more preferably 20 to 300 nm, even more preferably 20 to 150 nm, most preferably 30 to 80 nm. If the volume-average particle diameter is less than 20 nm, there is a case where crack resistance is deteriorated. On the other hand, if the volume-average particle diameter exceeds 450 nm, there is a case where transparency is deteriorated. Further, from the viewpoint of resistance to whitening on bending, the volume-average particle diameter is preferably less than 80 nm. Further, from the viewpoint of trimming property, the volume-average particle diameter is preferably 20 to 450 nm, more preferably 50 to 450 nm, even more preferably 60 to 450 nm, even more preferably 100 to 450 nm. It is to be noted that the volume-average particle diameter can be measured by a dynamic scattering method using, for example, MICROTRAC UPA150 (manufactured by NIKKISO CO., LTD.). More specifically, the volume-average particle diameter to the cross-linked polymer layer of the polymer (B) refers to the volume-average particle diameter of particles formed from the center of the polymer (B) particles to the cross-linked polymer layer. When the polymer (B) has two or more cross-linked polymer layers, the average-volume particle diameter to the cross-linked polymer layer of the polymer (B) refers to a volume-average particle diameter to the cross-linked polymer layer farthest from the center of the polymer (B) particles. In this specification, a graft ratio is used as a parameter to express the degree of covalent bonding of the hard polymer layer to the cross-linked polymer layer in the polymer (B).

The graft ratio of the polymer (B) is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most preferably 60 to 220%. If the graft ratio is less than 10%, the polymer (B) is likely to aggregate in a resulting molded body so that there is a fear that transparency is impaired or defects are caused by foreign matter. Further, the tensile elongation at breakage of the film is reduced so that cracking is likely to occur when the film is cut. If the graft ratio is 250% or higher, the melt viscosity of the resin material during molding, for example during film formation, increases, which tends to deteriorate film formability. The calculation formula of the graft ratio will be described later in the section of Examples.

It is to be noted that there is a case where part of the hard polymer layer is not bonded (grafted) to the cross-linked polymer layer (also referred to as free polymer), but this free polymer is also included in the polymer (B).

The cross-linked polymer content of the polymer (B) is preferably 10 to 90 wt. %, more preferably 20 to 80 wt. %, even more preferably 30 to 60 wt. %, most preferably 35 to 55 wt. % when the amount of the polymer (B) is taken as 100 wt. %. If the cross-linked polymer content is less than 10 wt. %, there is a case where a resulting resin material has low mechanical strength such as crack resistance. On the other hand, if the cross-linked polymer content exceeds 90 wt. %, the dispersibility of the polymer (B) is impaired and a resulting molded body cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the polymer (B) is not particularly limited, and a known emulsion polymerization method, emulsion-suspension polymerization method, suspension polymerization method, bulk polymerization method, or solution polymerization method can be used. However, the polymer (B) is particularly preferably produced by an emulsion polymerization method.

The polymer (B) is obtained by the multistep polymerization. At least one polymerization in this multistep polymerization is the polymerization of the monomer mixture containing the monomer represented by the formula (4) and (meth)acrylic acid and/or its salt. A multistep polymerization (meth)acrylic cross-linked structure-containing graft copolymer can be preferably used, which is obtained by polymerization of the monomer mixture containing the monomer represented by the formula (4) and (meth)acrylic acid and/or its salt, the polymerization being performed in the presence of a polymer containing a cross-linked structure constituted by a (meth)acrylic cross-linked polymer.

The monomer mixture containing the monomer represented by the formula (4) and (meth)acrylic acid and/or its salt is described as above.

The polymer containing the cross-linked structure constituted by the (meth)acrylic cross-linked polymer (i.e., a (meth)acrylic cross-linked structure-containing polymer) shall be a polymer obtained by multistep polymerization and containing at least (meth)acrylic cross-linked polymer. The (meth)acrylic cross-linked structure-containing polymer preferably has the cross-linked structure (rubber part) constituted by the (meth)acrylic cross-linked polymer formed by polymerization of 50 to 100 wt. % of acrylic ester, 50 to 0 wt. % of another monomer copolymerizable with the acrylic ester, and 0.05 to 10 parts by weight of a polyfunctional monomer (per 100 parts by weight of the total amount of the acrylic ester and the another monomer copolymerizable therewith). The rubber part may be obtained by one-step polymerization performed by mixing all the monomer components or by polymerization performed in two or more steps by changing the composition of monomers.

The (meth)acrylic cross-linked structure-containing polymer is not particularly limited as long as a (meth)acrylic cross-linked polymer (rubber part) is formed in at least one of the steps of multistep polymerization, and polymerization for forming a hard polymer may be performed before and/or after the polymerization for forming a (meth)acrylic cross-linked polymer.

Particularly, from the viewpoint of productivity, the polymer (B) to be used is preferably a (meth)acrylic cross-linked structure-containing graft copolymer obtained by (B-1) performing polymerization of a monomer mixture of 50 to 100 wt. % of acrylic ester, 50 to 0 wt. % of another monomer copolymerizable therewith, and 0.05 to 10 parts by weight of a polyfunctional monomer (per 100 parts by weight of the total amount of the acrylic ester and the another monomer copolymerizable therewith) to obtain (meth)acrylic cross-linked structure-containing polymer and then by (B-2) in the presence of the (meth)acrylic cross-linked structure-containing polymer, performing polymerization of a monomer mixture of the monomer represented by the above formula (4) and (meth)acrylic acid and/or its salt. Here, each of the polymerization of the monomer mixture in the step (B-1) and/or the polymerization of the monomer mixture in the step (B-2) may be performed in one step by mixing all the monomer components or in two or more steps by changing the composition of monomers. Further, examples of the acrylic ester, the another monomer copolymerizable therewith, and the polyfunctional monomer used in the step (B-1) and preferred amounts thereof to be used are the same as those described above with reference to the (meth)acrylic cross-linked polymer layer. Examples of the components of the monomer mixture used in the step (B-2) and preferred amounts thereof to be used are the same as those described above with reference to the hard polymer layer.

The volume-average particle diameter to the (meth)acrylic cross-linked structure of the (meth)acrylic cross-linked structure-containing graft copolymer as one preferable example of the polymer (B) is measured in the same manner as the volume-average particle diameter to the (meth)acrylic cross-linked polymer layer of the polymer (B), and the preferred range thereof is also the same as that of the polymer (B).

When the polymer (B) is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphates such as sodium polyoxyethylene lauryl ether phosphate and nonionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of the resulting polymer (B).

A multi-layered graft copolymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered multi-layered polymer. When the polymer latex is coagulated to obtain a multi-layered polymer, a known coagulant such as an acid or a salt can be used, but a magnesium salt, especially magnesium sulfate, is particularly preferably used as a coagulant from the viewpoint of improving heat stability during molding of a resulting copolymer.

The polymer (B) is blended so that the amount of the cross-linked polymer contained per 100 parts by weight of the resin material is preferably 1 to 60 parts by weight, more preferably 1 to 30 parts by weight, even more preferably 1 to 25 parts by weight. If the amount of the cross-linked polymer is less than 1 part by weight, there is a case where the crack resistance or vacuum moldability of the film is deteriorated or the film has poor optical isotropy due to an increase in photoelastic constant. On the other hand, if the amount of the cross-linked polymer exceeds 60 parts by weight, the heat resistance, surface hardness, transparency, or resistance to whitening on bending of the film tends to be deteriorated.

The ratio between the thermoplastic resin (A) and the polymer (B) to be blended is not particularly limited as long as the above-described requirement for blending is satisfied. Depending on the amount of the cross-linked polymer contained in the polymer (B), the amount of the polymer (B) to be blended is preferably 1 to 99 wt. %, more preferably 1 to 80 wt. %, even more preferably 1 to 60 wt. % when the total amount of the thermoplastic resin (A) and the polymer (B) is taken as 100 wt. %. If the amount of the polymer (B) to be blended is less than 1 wt. %, there is a case where the crack resistance or vacuum moldability of the film is deteriorated or the film has poor optical isotropy due to an increase in photoelastic constant. On the other hand, if the amount of the polymer (B) to be blended exceeds 99 wt. %, the heat resistance, surface hardness, transparency, or resistance to whitening on bending of the film tends to be deteriorated.

It is preferable that in the resin material of the present invention, the photoelastic constant of the polymer (B) and the photoelastic constant of the thermoplastic resin (A) be different in sign. With this, both orientation birefringence and photoelastic constant can be reduced, so that the resin material having high optical isotropy can be realized. In order to achieve optical isotropy, how to reduce orientation birefringence and photoelastic birefringence is important. Therefore, the concepts of "orientation birefringence" and "photoelastic birefringence" of each of the resin (A), the polymer (B), the thermoplastic resin material, and the film in the present invention will be first described below.

(Concept of Orientation Birefringence)

When a film is produced not by molding performed under such conditions that a polymer is oriented in a film, such as high discharge conditions, film drawing conditions, or low temperature conditions, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used without problem depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. As described above, the orientation birefringence of a molded body, especially an optical film, made of the resin material according to the present invention depends on how the resin material according to the present invention is molded or, in the case of a film, whether the film is stretched or not. In order to reduce the birefringence of the molded body, especially the optical film, it is necessary to set the orientation birefringence of the polymer (B) and the orientation birefringence of the thermoplastic resin (A). On the other hand, when polymer orientation hardly occurs in a molded body such as a film so that the birefringence of the molded body is sufficiently low, the orientation birefringence of the polymer (B) does not need to be greatly taken into consideration and is therefore not particularly limited when resin design is performed.

The measuring conditions of "orientation birefringence" in the present invention will be defined as follows. As described above, orientation birefringence develops due to orientation of polymer chains, but birefringence (orientation birefringence) in a polymer film varies depending on the degree of orientation of polymer chains. Therefore, in the present invention, "orientation birefringence" is measured under conditions defined as follows.

Each of the thermoplastic resin (A), the polymer (B), and the resin material needs to be formed into a some form of molded body to measure its orientation birefringence. In the present invention, the molded body is defined as a film or sheet. Hereinbelow, measurement of "orientation birefringence" will be described with reference to a case where the molded body is a melt-extrusion molded film or a press-molded sheet.

Measurement of "Orientation Birefringence" of Film

First, a test specimen of 25 mm×90 mm is cut out (so that its longitudinal direction is parallel to MD) from a film (original film) having a film thickness of 125 μm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence.

Measurement of "Orientation Birefringence" of Sheet

When the polymer (B) has at least a cross-linked structure, it is difficult to form a film only from the polymer (B) depending on the structure of the polymer (B). In this case, the polymer (B) is formed into a sheet by press molding to measure "orientation birefringence". Also when it is difficult to form a film from, for example, the thermoplastic resin (A)

as in the case of the polymer (B), a sheet is formed by press molding to measure orientation birefringence.

Hereinbelow, the measuring conditions of "orientation birefringence" at the time when a sheet formed by press molding is used will be described.

The polymer (B) is pressed at 190° C. to prepare a press-molded sheet having a thickness of 500 µm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence and determine the sign of orientation birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

(Concept of Photoelastic Birefringence (Photoelastic Constant))

As has been described above, photoelastic birefringence is birefringence caused by elastic deformation (distortion) of a polymer in a molded body when stress is applied to the molded body. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", each of the thermoplastic resin (A), the polymer (B), and the resin material needs to be formed into a some form of molded body to measure its photoelastic birefringence. In the present invention, the molded body is defined as a film or sheet. Hereinbelow, the measurement of "photoelastic constant" will be described with reference to a case where the molded body is a melt-extrusion molded film or a press-molded sheet.

Measurement of "Photoelastic Constant" of Film

As in the case of the above-described "orientation birefringence", a strip-shaped test specimen of 15 mm×90 mm is cut out (so that its longitudinal direction is parallel to TD) from a film (original film) having a film thickness of 125 µm. Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

Measurement of "Photoelastic Constant" of Sheet

As in the case of the above-described "orientation birefringence", the polymer (B) is formed into a sheet by press molding to measure its birefringence to determine a photoelastic constant. Also when it is difficult to form a film from, for example, the thermoplastic resin (A) as in the case of the polymer (B), a sheet is formed by press molding to measure photoelastic birefringence.

Hereinbelow, measurement of "photoelastic constant" at the time when a press-molded sheet is used will be described.

The polymer (B) is pressed at 190° C. to prepare a press-molded sheet having a thickness of 500 µm. Then, a test specimen of 25 mm×90 mm is cut out from the central portion of the obtained press-molded sheet. The measuring conditions and calculation method of "photoelastic constant" are the same as those used in the case of the above-described melt-extrusion molded film.

When there is a large difference in thickness between samples to be compared in the measurement of photoelastic birefringences of films and/or sheets, there is a possibility that the samples are different from each other in how stress is applied, and therefore there is a case where it is difficult to strictly compare photoelastic constants between the samples. However, there is not a large difference in how stress is applied between the sample of the film having a thickness of 125 µm and the sample of the press-molded sheet having a thickness of 500 µm described in the present invention, and therefore it is possible to compare photoelastic constants between samples when a difference in thickness between the samples is at such a level as described above. Therefore, both the above-described film and press-molded sheet can be appropriately used to measure a photoelastic constant (birefringence), but the film is preferably used. In the present invention, a press-molded sheet having a thickness of 500 µm is used as a means for determining the sign of photoelastic constant of the polymer (B). The same applies to orientation birefringence.

The photoelastic birefringence of a polymer is a property intrinsic to the structure of the polymer, and therefore when the photoelastic constant of the thermoplastic resin (A) is large, the photoelastic constant of the polymer (B) needs to be opposite in sign to the photoelastic constant of the thermoplastic resin (A). Further, the polymer (B) needs to be added in such an amount that the photoelastic birefringence of the thermoplastic resin (A) can be cancelled out. It is known that additivity is established between the photoelastic constant of a resulting polymer (copolymer) and the photoelastic constants of homopolymers corresponding to monomer species used for copolymerization. Therefore, when the photoelastic constant of the polymer (B) is opposite in sign to the photoelastic constant of the thermoplastic resin (A) and is larger, the amount of the polymer (B) that needs to be added to reduce the photoelastic birefringence of the resin material composed of the thermoplastic resin (A) and the polymer (B) and the photoelastic birefringence of the film thereof can be made smaller.

As for orientation birefringence, as described above, when the degree of polymer orientation in a molded body, especially an optical film, made of the resin material according to the present invention is not so high and therefore the orientation birefringence of the molded body does not become a problem when the molded body is practically used, it is not particularly necessary to take the orientation birefringence of the polymer (B) into consideration when the polymer (B) is designed. However when the orientation birefringence of the resulting molded body becomes a problem when the molded body is practically used, the orientation birefringence of the polymer (B) needs to be made opposite in sign to the orientation birefringence of the thermoplastic resin (A).

The above-described technical idea is important to reduce birefringence of the resin material and film according to the present invention.

When the polymer (B) of the present invention includes the cross-linked polymer layer and the hard polymer layer, the hard polymer layer can achieve the functions of (1) uniformly dispersing the polymer (B) in the matrix (thermoplastic resin (A)) and (2) cancelling out the birefringence of the thermoplastic resin (A) to improve the optical isotropy of the resin material and the film according to the present invention.

When the orientation birefringence of a molded body such as a film is not so high and therefore does not become a problem, such as when a molded body is not subjected to a stretching process, the function (2) can be achieved by allowing the photoelastic constant of the hard polymer layer to be opposite in sign to that of the matrix (thermoplastic resin (A)) so that the molded body has a very small photoelastic constant. On the other hand, when the orientation birefringence of a molded body such as a film is relatively large and therefore becomes a problem, such as when a molded body is subjected to a stretching process, the function (2) can be achieved by allowing both the photoelastic constant and orientation birefringence of the hard polymer layer to be opposite in sign to those of the matrix (thermoplastic resin (A)) so that not only the photoelastic constant of the molded body but also the orientation birefringence of the molded body is very low.

A monomer species that is used for forming the hard polymer layer of the polymer (B) and is suitable for cancelling out the photoelastic birefringence of the thermoplastic resin (A) shall be selected so that the photoelastic constant of the thermoplastic resin (A) and the photoelastic constant of the polymer (B) are opposite in sign to each other.

Specific examples of a monomer are given below as a reference for setting the photoelastic constant of a polymer, but the monomer species is not limited thereto (a value within [ ] represents the photoelastic constant of its homopolymer).

Monomers showing positive photoelastic birefringence:
Benzyl methacrylate [$48.4 \times 10^{-12}$ $Pa^{-1}$]
Dicyclopentanyl methacrylate [$6.7 \times 10^{-12}$ $Pa^{-1}$]
Styrene [$10.1 \times 10^{-12}$ $Pa^{-1}$]
Parachlorostyrene [$29.0 \times 10^{-12}$ $Pa^{-1}$]
Monomers showing negative photoelastic birefringence:
Methyl methacrylate [$-4.3 \times 10^{-12}$ $Pa^{-1}$]
2,2,2-trifluoroethyl methacrylate [$-1.7 \times 10^{-12}$ $Pa^{-1}$]
2,2,2-trichloroethyl methacrylate [$-10.2 \times 10^{-12}$ $Pa^{-1}$]
Isobornyl methacrylate [$-5.8 \times 10^{-12}$ $Pa^{-1}$]

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence becomes substantially zero when the ratio of poly-MMA/BzMA is 92/8 (wt. %). The same applies to a mixture (alloy) of two or more polymers, that is, additivity is established between the photoelastic constant of a polymer mixture and the photoelastic constants of polymers. This is why it is preferable to allow the photoelastic constant of the thermoplastic resin (A) and the photoelastic polymer (B) to be opposite in sign and to adjust the amounts (wt. %) of the thermoplastic resin (A) and the polymer (B) to be blended to reduce the photoelastic birefringences of the resin material and the film according to the present invention.

Further, it is known that additivity is established between the orientation birefringence of a copolymer and the intrinsic birefringences of homopolymers corresponding to monomer species used for copolymerization. The same applies to a mixture (alloy) of two or more polymers, that is, additivity is established between the orientation birefringence of a polymer mixture and the intrinsic birefringences of polymers. The monomer species that is used for forming the hard polymer layer of the polymer (B) and is suitable for cancelling out the orientation birefringence of the thermoplastic resin (A) shall be selected so that the orientation birefringence of the thermoplastic resin (A) and the orientation birefringence of the polymer (B) are opposite in sign. Specific examples of a monomer are given below as a reference for setting the orientation birefringence of a polymer (a value within [ ] represents the intrinsic birefringence of a homopolymer consisting of the monomer), but the monomer species is not limited thereto. It is to be noted that the term "intrinsic birefringence" refers to birefringence (orientation birefringence) when a polymer is completely oriented in one direction.

Polymers showing positive intrinsic birefringence:
Polybenzyl methacrylate [+0.002]
Polyphenylene oxide [+0.210]
Bisphenol A polycarbonate [+0.106]
Polyvinyl chloride [+0.027]
Polyethylene terephthalate [+0.105]
Polyethylene [+0.044]
Polymers showing negative intrinsic birefringence:
Polymethyl methacrylate [−0.0043]
Polystyrene [−0.100]

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
| --- | --- | --- |
| Polymethyl methacrylate (MMA) | Negative | Negative |
| Poly(2,2,2-trifluoroethyl methacrylate) (3FMA) | Positive | Negative |
| Polybenzyl methacrylate (BzMA) | Positive | Positive |

For example, it is known that the orientation birefringence of a poly(MMA/BzMA) copolymer having a composition of around 82/18 (wt. %) is substantially zero and that the photoelastic birefringence (constant) of a poly(MMA/BzMA) copolymer having a composition of around 92/8 (wt. %) is substantially zero. As shown above, when the thermoplastic resin (A) is an acrylic resin, both the orientation birefringence and the photoelastic constant thereof are often negative, and therefore benzyl methacrylate whose orientation birefringence and photoelastic birefringence are both positive is suitable for use in the polymer (B) (especially, in the hard polymer layer that is the outer layer of the polymer (B)) because the orientation birefringence of the thermoplastic resin (A) can be cancelled out while the photoelastic birefringence of the thermoplastic resin (A) is also cancelled out.

The resin material according to the present invention may be subjected to molding, such as extrusion molding, injection molding, compression molding, blow molding, or spinning molding, on heating directly in the form of particles or after pelletization using an extruder to obtain a molded body having a shape suitable for its intended use. The melting temperature of the resin material at the time of heat melting is not especially limited but is preferably 230 to 300° C. A film is especially useful as the molded body and is successfully processed by, for example, a conventional melt extrusion method such as an inflation method or a T-die extrusion method, a calendering method, or a solvent casting method. Among them, a melt extrusion method using no solvents is particularly preferred. The use of a melt extrusion method makes it possible to reduce production cost or loads to the global environment or working environment caused by solvents.

From the viewpoint of obtaining a molded body that does not exhibit birefringence resulting from molding processing and can be practically used without problem, the value of orientation birefringence of the resin material according to the present invention is preferably $-15\times10^{-4}$ to $15\times10^{-4}$, more preferably $-10\times10^{-4}$ to $10\times10^{-4}$, even more preferably $-5\times10^{-4}$ to $5\times10^{-4}$. Further, from the viewpoint of obtaining stable optical characteristics, the value of orientation birefringence of the resin material according to the present invention is preferably $-1.7\times10^{-4}$ to $1.7\times10^{-4}$, more preferably $-1.6\times10^{-4}$ to $1.6\times10^{-4}$, even more preferably $-1.5\times10^{-4}$ to $1.5\times10^{-4}$, particularly preferably $-1.0\times10^{-4}$ to $1.0\times10^{-4}$, more particularly preferably $-0.5\times10^{-4}$ to $0.5\times10^{-4}$, and most preferably $-0.2\times10^{-4}$ to $0.2\times10^{-4}$.

From the viewpoint of obtaining a molded body whose birefringence resulting from the application of stress in an environment of, for example, high temperature and high humidity is low, the photoelastic constant of the resin material according to the present invention is preferably $-10\times10^{-12}$ to $10\times10^{-12}$, more preferably $-4\times10^{-12}$ to $4\times10^{-12}$, even more preferably $-2\times10^{-12}$ to $2\times10^{-12}$, even more preferably $-1.5\times10^{-12}$ to $1.5\times10^{-12}$, particularly preferably $-1\times10^{-12}$ to $1\times10^{-12}$, more particularly preferably $-0.5\times10^{-12}$ to $0.5\times10^{-12}$, most preferably $-0.3\times10^{-12}$ to $0.3\times10^{-12}$. When the resin material having a photoelastic constant of $-4\times10^{-12}$ to $4\times10^{-12}$ is formed into a film and the film is used in a liquid crystal display device, a phase difference variation, a reduction in the contrast of peripheral area of a display screen, and light leakage do not occur.

The resin material according to the present invention has high mechanical strength. The mechanical strength can be evaluated by, for example, tensile elongation at breakage in a tensile test, and the tensile elongation at breakage of the resin material according to the present invention is preferably 10% or more, more preferably 20% or more, even more preferably 30% or more, even more preferably 40% or more, particularly preferably 50% or more, more particularly preferably 60% or more, most preferably 90% or more. The resin material according to the present invention having a tensile elongation at breakage within the above range does not cause a problem such as cracking during molding processing, and is therefore extremely excellent in productivity. Further, when a product using the resin material according to the present invention is actually used, trouble such as cracking does not occur. The occurrence of cracking is particularly correlated with tensile elongation at breakage, and a higher tensile elongation at breakage means higher cracking resistance.

Further, the resin material of the present invention has high heat stability. For example, in thermogravimetry (TGA), a 1% weight reduction temperature of the resin material of the present invention is preferably 290° C. or more, more preferably 300° C. or more, and most preferably 310° C. or more. The 1% weight reduction temperature can be measured by a thermogravimetry apparatus such as SII EXSTAR 6000 or TG/DTA 6300 produced by Seiko Instruments Inc. The 1% weight reduction temperature can be calculated as below based on the obtained measurement results.

Weight reduction rate=((wt−wt0)/wt0)×100%

Wt=Weight of sample at a specific temperature
wt0=Reference weight (weight of sample at 40° C.)
Temperature when weight reduction rate is −1%=1% weight reduction temperature When the resin material according to the present invention is molded into a film, both surfaces of the film may be brought into contact with (sandwiched between) rolls or metal belts, especially rolls or metal belts heated to a temperature around the glass transition temperature of the film, at the same time, if necessary, so that the film has higher surface properties. Further, the film may be subjected to lamination molding or may be modified by biaxial stretching depending on its intended use.

The resin material according to the present invention can be formed into a film even under such high-temperature molding conditions that a T-die film molding machine is used without causing contamination of the molding machine due to scattering of a UV absorber or film defects.

Hereinbelow, as one example of a method for producing the film according to the present invention, a method for producing a film by melt-extrusion molding of the resin material according to the present invention will be described in detail.

It is to be noted that in the following description, a film molded by melt extrusion is referred to as "melt-extruded film" to differentiate it from a film molded by another method such as solution casting.

When the resin material according to the present invention is molded into a film by melt extrusion, the resin material according to the present invention is first supplied to an extruder and melted by heating.

The resin material is preferably subjected to predrying before supplied to the extruder. By performing such predrying, it is possible to prevent foaming of the resin extruded from the extruder.

A method for predrying is not particularly limited, but for example, a raw material (i.e., the resin material according to the present invention) may be predried by a hot air drier or the like after formed into pellets or the like.

Further, the extruder for molding the resin material according to the present invention preferably has one or more devolatilizers for removing volatile matter produced during melting by heating. By providing one or more devolatilizers, it is possible to reduce deterioration of film appearance due to foaming or decomposition/deterioration reaction of the resin.

Further, during melt extrusion for molding the resin material according to the present invention, an inert gas such as nitrogen or helium is preferably supplied to a cylinder of the extruder together with the resin material. By supplying an inert gas, it is possible to reduce the concentration of oxygen in a system to reduce decomposition caused by oxidation degradation, cross-linking, or degradation of appearance or quality such as yellowing.

Then, the resin material melted by heating in the extruder is supplied through a gear pump or a filter to a T-die. By using a gear pump at this time, it is possible to improve uniformity of the amount of the resin to be extruded to reduce a thickness variation. On the other hand, the use of a filter makes it possible to remove foreign matter in the resin material to obtain a film having excellent appearance without defects.

The filter to be used is preferably a stainless steel leaf-disk type filter that can remove foreign matter from a melted polymer, and a filter element to be used is preferably of fiber type, powder type, or complex type thereof. The filter can be preferably used for an extruder or the like for use in pelletization or film formation.

Then, the non-birefringent resin material supplied to the T-die is extruded through the T-die as a sheet-shaped melted resin. The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll having an elastic deformable metal elastic external cylinder having a smooth surface.

By cooling the sheet-shaped melted resin sandwiched between such rigid metal roll and flexible roll having a metal elastic external cylinder, it is possible to correct surface microirregularities or die lines to obtain a film having a smooth surface and a thickness variation of 5 μm or less.

It is to be noted that the term "cooling roll" used in this specification includes the meaning of "touch roll" and "cooling roll".

Even when the above-described rigid metal roll and flexible roll are used, there is a case where, when a film to be formed is thin, the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to obtain a film.

The film according to the present invention has very high toughness and excellent flexibility and therefore does not need to be stretched to improve strength, which increases productivity due to omission of a stretching process and has a cost advantage. The film according to the present invention has high transparency and therefore can have a thickness of 10 μm or more to achieve high strength. Further, the film according to the present invention exhibits substantially no orientation birefringence even when stretched and has optical isotropy. Further, the film according to the present invention is less likely to thermally shrink during secondary molding such as vacuum molding or during use at high temperature.

The film according to the present invention has the above effects even in an unstretched state, but may be stretched to further improve strength and film thickness accuracy. Further, selection of optimum stretching conditions makes it easy to produce a film that exhibits substantially no birefringence and substantially no increase in haze and has a small thickness variation.

When the film according to the present invention is a stretched film, the stretched film (uniaxially-stretched film or biaxially-stretched film) can be produced by once molding the resin material according to the present invention to form an unstretched film and then by subjecting the unstretched film to uniaxial stretching or biaxial stretching. For example, a sheet-shaped melted resin is sandwiched between the above-described two cooling rolls and then cooled to once obtain an unstretched film having a thickness of 150 μm, and then the film is subjected to vertical and horizontal biaxial stretching to have a thickness of 40 μm.

In this specification, for convenience of description, an unstretched film that is obtained by molding the resin material according to the present invention but is not subjected to stretching is referred to as "raw material film".

When stretched, the raw material film may be continuously subjected to stretching just after molding or may be subjected to stretching after once stored or transferred after molding.

It is to be noted that when stretched just after molding, the raw material film may be stretched very shortly (in some cases, instantaneously) after molding in a film production process or may be stretched some time after once produced.

When the film according to the present invention is a stretched film, the raw material film shall be kept in a film form good enough to be stretched and does not always need to be in a perfect film state.

A method for stretching the raw material film is not particularly limited, and a conventionally-known any stretching method may be used. More specifically, the raw material film may be subjected to, for example, lateral stretching using a tenter, longitudinal stretching using a roll, or sequential biaxial stretching in which such lateral stretching and longitudinal stretching are sequentially performed.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than a stretching temperature by 0.5 to 5° C., preferably 1 to 3° C. and then cooled to the stretching temperature before stretching.

By preheating the raw material film to a temperature within the above range, it is possible to accurately maintain the thickness of the raw material film or to prevent a resulting stretched film from having low thickness accuracy or a thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight, tends to occur. Further, if a difference between the preheating temperature and the stretching temperature of the raw material film is small, the raw material film before stretching tends to be difficult to maintain thickness accuracy or a resulting stretched film tends to have a large thickness variation or low thickness accuracy.

It is to be noted that when the resin material according to the present invention is molded to form a raw material film and the raw material film is stretched, it is difficult to improve thickness accuracy by utilizing a necking phenomenon. Therefore, in the present invention, control of the above-described preheating temperature is important to maintain or improve the thickness accuracy of a resulting film.

The stretching temperature at which the raw material film is stretched is not particularly limited, and may be changed according to mechanical strength, surface properties, and thickness accuracy required for a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of trouble such as adhesion of the film to a roll.

On the other hand, if the stretching temperature is higher than the above upper limit, a resulting stretched film tends to have a large thickness variation or the mechanical properties of the film, such as percentage of elongation, tear propagation strength, and resistance to flexural fatigue, tend not to be sufficiently improved. Further, trouble such as adhesion of the film to a roll tends to occur.

If the stretching temperature is lower than the above lower limit, a resulting stretched film tends to have a large haze or, in an extreme case, a problem, such as the occurrence of tears or cracks in the film, tends to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as elongation percentage, tear propagation strength, and resistance to flexural fatigue. Therefore, it is possible to produce a stretched film that has a thickness variation of 5 μm or less, exhibits substantially no birefringence, and has a haze of 2.0% or less.

If necessary, the film according to the present invention may be used by laminating another film thereon with an adhesive or the like or by forming a coating layer such as a hard coating layer or the like on the surface thereof.

If necessary, the resin material according to the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

Further, the resin material according to the present invention shall contain at least one thermoplastic resin (A) and at least one polymer (B), and one or more other resins may be added thereto without any particular limitation as long as the objects of the present invention can be achieved. Examples of the other resins include the thermoplastic resins mentioned above as examples of the thermoplastic resin (A), multi-layered polymers such as core-shell polymers and graft copolymers, and thermoplastic elastomers such as block polymers.

If necessary, the resin material according to the present invention may contain a known additive or another resin. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

If necessary, the surface gloss of the film according to the present invention may be reduced by a known method. This can be achieved by, for example, kneading an inorganic filler or cross-linked polymer particles with the resin material. Alternatively, a film obtained from the resin material may be embossed to reduce its surface gloss.

The film according to the present invention may be laminated on a metal or plastic. Examples of a method for laminating the film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

An article on which the film according to the present invention is laminated can be used as, for example, substitutes for paint such as car interior materials and car exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal displays of terminal equipment such as mobile phones, smartphones, and tablets, and parts of electric or electronic devices.

The film according to the present invention can be used for various purposes listed below for its properties such as heat resistance, transparency, and flexibility. More specifically, the film according to the present invention can be used for interior and exterior of cars, personal computers, mobile devices, solar batteries, and the like; solar battery backsheets; taking lenses for cameras, VTRs, and projectors; finders, filters, prisms, Fresnel lenses, and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as light guide plates, diffuser plates, backsheets, reflection sheets, polarizer protective films, polarizing films, transparent resin sheets, phase difference films, light diffusing films, prism sheets, and the like and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The film according to the present invention can be used also as a substitute for a molded body using a transfer foil sheet.

A molded body, other than a film, made of the resin material according to the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, screens for projectors, optical filters, optical fibers, optical waveguides, prisms, lenses for lighting, car headlights, medical supplies requiring sterilization, microwave cooking vessels, housings for home appliances, toys, and recreation items.

Since the film of the present invention is excellent in optical characteristics such as optical homogeneity and transparency, the film of the present invention can be used as an optical film. With this, the film of the present invention is particularly suitable for use in known optical applications, such as peripheral materials of liquid crystal displays such as optical isotropic films, polarizer protective films, and transparent conductive films. Since the film of the present invention has excellent mechanical strength, its film transportability and crack resistance during practical use are excellent and the occurrence of micro-cracking in a film trimming process during production can be reduced. Further, since the film of the present invention has high mechanical strength, it is not necessary to perform a stretching process to improve film strength. Therefore, it possible to produce a thick optical film having a film thickness of, for example, 80 μm or more that is difficult for a stretched film to have.

The film according to the present invention may be bonded to a polarizer to be used as a polarizing plate. That is, the film according to the present invention may be used as a polarizer protective film of a polarizing plate. The polarizer is not particularly limited and may be any conventionally-known polarizer. A specific example of such a polarizer is iodine-doped stretched polyvinyl alcohol.

If necessary, the film according to the present invention may be subjected to surface treatment. For example, when subjected to surface finishing such as coating or laminated on the surface of another film, the film according to the present invention is preferably subjected to surface treatment. By subjecting the film according to the present invention to such surface treatment, it is possible to improve adhesion between the film according to the present invention and a coating material or another film to be laminated. Since the film according to the present invention has high solvent resistance, appearance defects caused by a solvent do not occur when forming various coatings on the film according to the present invention. Thus, the film according to the present invention can obtain excellent surface appearance. Further, since the film according to the present invention can achieve high heat resistance, a curing temperature and a drying rate in a film coating process can be increased. Thus, productivity can be improved.

It is to be noted that the purpose of surface treatment of the film according to the present invention is not limited to the above purposes. The film according to the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The thickness of the film according to the present invention is not particularly limited, but is preferably 500 μm or less, more preferably 300 μm or less, particularly preferably 200 μm or less. Further, the thickness of the film according to the present invention is preferably 10 μm or more, more preferably 30 μm or more, even more preferably 50 μm or more, particularly preferably 100 μm or more. The film according to the present invention having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above upper limit, the film after molding is non-uniformly cooled and therefore tends to have non-uniform optical characteristics. If the thickness of the film is less than the above lower limit, there is a case where the film is difficult to handle.

The film according to the present invention preferably has a haze value of 2.0% or less, more preferably 1.0% or less, even more preferably 0.8% or less, particularly preferably 0.5% or less. When the film according to the present invention has a haze value within the above range, its transparency is sufficiently high and therefore the film is suitable for optics applications, decorative applications, interior applications, or vacuum molding applications requiring transparency.

The film according to the present invention preferably has a total light transmittance of 85% or higher, more preferably 88% or higher. When the film according to the present invention has a total light transmittance within the above range, its transparency is sufficiently high and therefore the film is suitable for optics applications, decorative applications, interior applications, or vacuum molding application requiring transparency.

The film according to the present invention preferably has a glass transition temperature of 100° C. or higher, more preferably 115° C. or higher, even more preferably 120° C. or higher, even more preferably 124° C. or higher. When having a glass transition temperature within the above range, the film according to the present invention can have sufficiently high heat resistance.

The film according to the preset invention preferably has a tensile elongation at breakage of 10% or more, more preferably 20% or more, even more preferably 30% or more, even more preferably 40% or more, particularly preferably 50% or more, more particularly preferably 60% or more, most preferably 90% or more. When having a tensile elongation at breakage within the above range, the film according to the present invention is less likely to be cracked when cut out with a Thomson blade or a cutter blade (trimming property) and is less likely to be broken when rolled up or when the surface thereof is subjected to after-processing such as coating, vapor deposition, sputtering, or bonding to a protective film. Further, the film has high crack resistance against bending, and therefore trouble such as cracking does not occur not only when the film is subjected to after-processing but also when the film is practically used as a product. The occurrence of cracking is particularly correlated with tensile elongation at breakage, and a higher tensile elongation at breakage means higher crack resistance.

As described above, the film according to the present invention can be used as an optical film. Particularly, when used as a polarizer protective film, the film according to the present invention preferably has low optical anisotropy. Particularly, the optical anisotropy of the film is preferably low not only in its in-plane direction (length and width directions) but also in its thickness direction. In other words, both the in-plane phase difference and the absolute value of the thickness-direction phase difference of the film are preferably small. More specifically, the in-plane phase difference is preferably 10 nm or less, more preferably 6 nm or less, even more preferably 5 nm or less, even more preferably 3 nm or less. The absolute value of the thickness-direction phase difference is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference exceeding 50 nm is used as a polarizer protective film of a polarizing plate in a liquid crystal display device, there is a case where a problem such as a reduction in the contrast of the liquid crystal display device occurs.

Phase difference is an index value calculated based on birefringence, and in-plan phase difference (Re) and thickness-direction phase difference (Rth) can be calculated by the following formulas, respectively. In the case of an ideal film that is completely optically isotropic in three dimensional directions, its in-plane phase difference Re and thickness-direction phase difference Rth are both 0.

$$Re=(nx-ny)\times d$$

$$Rth=((nx+ny)/2-nz)\times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively, d represents a film thickness, and nx−ny represents orientation birefringence. It is to be noted that in the case of a melt-extruded film, MD direction corresponds to the X axis, and in the case of a stretched film, a stretching direction corresponds to the X axis.

The value of orientation birefringence of a molded body made of the resin material according to the present invention is preferably $-15\times10^{-4}$ to $15\times10^{-4}$, more preferably $-10\times10^{-4}$ to $10\times10^{-4}$, even more preferably $-5\times10^{-4}$ to $5\times10^{-4}$, even more preferably $-1.6\times10^{-4}$ to $1.6\times10^{-4}$, particularly preferably $-1\times10^{-4}$ to $1\times10^{-4}$, more particularly preferably $-0.5\times10^{-4}$ to $0.5\times10^{-4}$, most preferably $-0.2\times10^{-4}$ to $0.2\times10^{-4}$. When the orientation birefringence of the molded body is within the above range, the molded body does not exhibit birefringence resulting from molding processing and therefore can be practically used without problem.

The value of orientation birefringence of a film made of the resin material according to the present invention is preferably $-1.7\times10^{-4}$ to $1.7\times10^{-4}$, more preferably $-1.6\times10^{-4}$ to $1.6\times10^{-4}$, even more preferably $-1.5\times10^{-4}$ to $1.5\times10^{-4}$, even more preferably $-1.0\times10^{-4}$ to $1.0\times10^{-4}$, particularly preferably $-0.5\times10^{-4}$ to $0.5\times10^{-4}$, most preferably $-0.2\times10^{-4}$ to $0.2\times10^{-4}$. When the orientation birefringence of the film is within the above range, the film does not exhibit birefringence resulting from molding processing and therefore can have stable optical characteristics. Further, the film is very suitable as an optical film for use in liquid crystal displays and the like.

A molded body made of the resin material according to the present invention preferably has a photoelastic constant of $-10\times10^{-12}$ to $10\times10^{-12}$, more preferably $-4\times10^{-12}$ to $4\times10^{-12}$, even more preferably $-2\times10^{-12}$ to $2\times10^{12}$, even more preferably $-1\times10^{-12}$ to $1\times10^{-12}$, even more preferably $-0.5\times10^{-12}$ to $0.5\times10^{-12}$, most preferably $-0.3\times10^{-12}$ to $0.3\times10^{-12}$. When the photoelastic constant of the molded body is within the above range, the molded body exhibits only small birefringence even when stress is applied thereto in an environment of, for example, high temperature and high humidity, and therefore can be practically used without problem.

A film made of the resin material according to the present invention preferably has a photoelastic constant of $-4\times10^{-12}$ $Pa^{-1}$ to $4\times10^{-12}$ $Pa^{-1}$, more preferably $-1.5\times10^{-12}$ $Pa^{-1}$ to $1.5\times10^{-12}$ $Pa^{-1}$, even more preferably $-1.0\times10^{-12}$ $Pa^{-1}$ to $1.0\times10^{-12}$ $Pa^{-1}$, even more preferably $-0.5\times10^{-12}$ $Pa^{-1}$ to $0.5\times10^{-12}$ $Pa^{-1}$, most preferably $-0.3\times10^{-12}$ $Pa^{-1}$ to $0.3\times10^{-12}$ $Pa^{-1}$. When the film having a photoelastic constant within the above range is used in a liquid crystal display device, the molded body exhibits only small birefringence even when stress is applied thereto in an environment of, for example, high temperature and high humidity, and therefore a phase difference variation, a reduction in the contrast of peripheral area of a display screen, and light leakage do not occur.

Since the film according to the present invention has excellent heat stability, molding using a polymer filter having high filtration accuracy can be realized. With this, it is possible to obtain a film in which the number of foreign matters is preferably less than 100 per $m^2$, more preferably less than 50 per $m^2$, and further preferably less than 10 per $m^2$.

EXAMPLES

Hereinbelow, the present invention will be described more specifically with reference to examples, but is not limited to these examples. In the following description, "part(s)" and "%" represent "part(s) by weight" and "wt. %", respectively unless otherwise specified.

(Volume-Average Particle Diameter to (Meth)Acrylic Cross-Linked Polymer Layer of Graft Copolymer)

The volume-average particle diameter to the (meth) acrylic cross-linked polymer layer of a graft copolymer (volume-average particle diameter of acrylic rubber particles) was measured using an acrylic rubber particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula, a chain transfer agent was regarded as a monomer charged.

Polymerization conversion ratio (%)=[(total weight of raw materials charged×solid content−total weight of raw materials other than water and monomers)/weight of monomers charged]×100

(Graft Ratio)

Two grams of the polymer (B) obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate a graft ratio by the following formula.

Graft ratio (%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.

(Vicat Softening Point)

The measurement of the Vicat softening point was performed using the obtained polymer (B). The polymer (B) was kneaded by an 8-ich laboratory test roll (produced by Nippon Roll MFG Co., Ltd.) for five minutes at a roll temperature of 180° C., a rotation speed of 20 rpm for a front roll, and a rotation speed of 18 rpm for a rear roll. Thus, a roll sheet (having a thickness of 1.0 mm and a width of 35 cm) was obtained. Four or five roll sheets obtained as above were stacked on one another and pressed for ten minutes at 190° C. Thus, a plate having a thickness of 5 mm was produced. This plate was subjected to measurement based on JIS K7206 using HDT.VSPT.TESTER (Model No. S-6M produced by Toyo Seiki Seisaku-Sho, Ltd.) at a temperature rise rate of 0.8° C./min and a load of 1 kgf.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 cm$^{-1}$ (Abs ester) and the absorption intensity of imide carbonyl groups at 1660 cm$^{-1}$ (Abs imide) were determined, and the ratio between them was determined as an imidization ratio (Im % (IR)). The term "imidization ratio" used herein refers to the ratio of imide carbonyl groups to the total carbonyl groups.

(Glutarimide Unit Content)

A resin was subjected to $^1$H-NMR analysis using $^1$H-NMR BRUKER Avance (400 MHz) to determine the amount of each monomer unit (mol %), such as a glutarimide unit or an ester unit, contained in the resin, and the monomer unit content (mol %) was converted to a monomer unit content (wt. %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Each composition was processed into a sheet, and the refractive index (nD) of the sheet was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The film thickness of a film was measured using a digimatic indicator manufactured by Mitutoyo Corporation.

(Production of uniaxially-stretched film (film stretched twice) and measurement of orientation birefringence)

A 25 mm×90 mm test specimen was cut out from an unstretched original film having a thickness of 125 μm (so that its longitudinal direction was parallel to MD), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness-direction phase difference Rth (incidence angle: 40°) were also measured (measurement of in-plane phase difference Re and thickness-direction phase difference Rth will be described in detail later).

It is to be noted that formation of a uniaxially-stretched film of the polymer (B) itself and measurement of the orientation birefringence of the film were performed in the following manner: only the polymer (B) was pressed at 190° C. to form a pressed plate having a thickness of 500 μm, a 25 mm×90 mm test specimen was cut out from the central portion of the obtained pressed plate, and measurement of orientation birefringence was performed in the same manner as described above.

In the case of the resin (A), an unstretched original film having a thickness of 125 μm was produced in the same manner as in Example 1, and measurement of orientation birefringence was performed in the same manner as described above.

(Orientation Birefringence of Original Film)

A 40 mm×40 mm test specimen was cut out from an unstretched original film (thickness: 125 μm), and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

(In-Plane Phase Difference Re and Thickness-Direction Phase Difference Rth)

A 40 mm×40 mm test specimen was cut out from a film having a thickness of 125 μm, and the in-plane phase difference Re of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, Rth=((nx+ny)/2−nz)×d. It is to be noted that the measured value was multiplied by 100 (μm)/film thickness (μm) to be converted to a value per 100 μm thickness, and the thus obtained value is shown in Table 3.

(Photoelastic Constant)

A strip-shaped test specimen of 15 mm×90 mm was cut out (so that its longitudinal direction was parallel to TD) from a film having a thickness of 125 μm. The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the polymer (B) itself was measured in the following manner: only the polymer (B) was pressed at 190° C. to prepare a pressed plate having a thickness of 500 μm, a 15 mm×90 mm test specimen was cut out from the central portion of the obtained pressed plate, and the photoelastic constant of the test specimen was measured in the same manner as described above.

In the case of the resin (A), an unstretched original film having a thickness of 125 μm was produced in the same manner as in Example 1, and measurement of photoelastic constant was performed in the same manner as described above.

(Evaluation of Foreign Matter)

Samples having a total area of 1 m² were cut out from an obtained film, and the total number of foreign substances having a size of 20 μm or more was counted by, for example, observation with a microscope and evaluated according to the following criteria:

○: less than 100 per m²
x: 100 or more per m².

(Evaluation of Mechanical Strength)

Mechanical strength was evaluated in terms of trimming property and tensile elongation at breakage as an indicator of crack resistance (tensile elongation: %).

Evaluation of Trimming Property

A film having a thickness of 125 μm was cut using a cutter, and the cut surface of the film was observed to evaluate the trimming property of the film according to the following criteria:

○: no occurrence of cracking was observed in the cut surface;
Δ: occurrence of cracking was observed in the cut surface; and
x: occurrence of cracking was significantly observed in the cut surface.

Tensile Elongation at Breakage

A film having a thickness of 125 μm was used. A tensile test was performed in accordance with ISO527-3 (JIS K7127) using a type 5 test specimen at a test rate in MD of 200 mm/min, a temperature of 23±2° C., and a humidity of 50±5%.

(Heat Stability)

The heat stability was measured using a ratio of reduction in melt viscosity and thermogravimetry (TGA).

Ratio of Reduction in Melt Viscosity

The melt viscosity of an obtained resin composition was measured under conditions specified in JIS K7199 (die temperature: 260° C., shear rate: 24 sec$^{-1}$, capillary die diameter: 1 mm, dwell time: 1 hour), and the rate of reduction in melt viscosity was calculated by the following calculation formula from the melt viscosity at a dwell time of 10 minutes and the melt viscosity at a dwell time of 1 hour, and was regarded as an indicator of heat stability. After the test, a strand was observed to determine the presence or absence of foaming due to thermal decomposition of the resin.

Ratio of reduction in melt viscosity=(melt viscosity at a dwell time of 10 minutes−melt viscosity at a dwell time of 1 hour)/(melt viscosity at a dwell time of 10 minutes)×100(%)

The heat stability was evaluated according to the following criteria:

○: the ratio of reduction in melt viscosity was less than 20% and no foaming was observed in the strand; and
x: the ratio of reduction in melt viscosity was 20% or higher and foaming was observed in the strand.

The melt viscosity was evaluated according to the following criteria:

○: the melt viscosity was low and therefore the resin composition could be extruded without difficulty; and
x: the melt viscosity was high and therefore the filter was damaged and desired filtration accuracy was not achieved.

Thermogravimetry (TGA)

SII EXSTAR 6000 and TG/DTA 6300 produced by Seiko Instruments Inc. were used. Measurements were performed at a start temperature of 30° C., a final temperature of 460° C., and a temperature rise rate of 5° C./min for a holding time of 0 minute. A pellet before the formation of the film was used as a sample, and the amount of sample was 20 mg. Nitrogen was used as a purge gas (400 ml/min).

The 1% weight reduction temperature was calculated as below.

Weight reduction rate=((wt−wt0)/wt0)×100%

Wt=Weight of sample at a specific temperature
wt0=Reference weight (weight of sample at 40° C.)
Temperature when weight reduction rate is −1%=1% weight reduction temperature (Solvent Resistance)

A film having a thickness of 125 μm was used. 0.5 ml of the solvent was dropped using a Pasteur pipette in an atmosphere of 23° C., and the film was left for an hour until the solvent completely volatilized (N=10).

◯: Deformations such as generation of creases, depressions, or projections did not occur on the surface.

x: Deformations such as generation of creases, depressions, or projections occurred on the surface.

(Appearance Evaluation of Molded Body)

An evaluation was performed as below using a film having a thickness of 60 μm.

◯: Surface unevenness, minute satin-like roughness, and the like were not formed, and variations in thickness in an MD direction 1 m were not more than 2 μm.

x: Surface unevenness, minute satin-like roughness, and the like were formed, and variations in thickness in an MD direction 1 m were more than 2 μm.

Production Example 1

<Production of Glutarimide Acrylic Resin (A1)>

A glutarimide acrylic resin (A1) was produced using polymethylmethacrylate as a raw material resin and monomethylamine as an imidization agent.

In this production, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by KUBOTA Corporation).

The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect unstable extrusion, resin pressure meters were provided at the discharge port of the first extruder, the center of the part connecting the first and second extruders, and the discharge port of the second extruder.

In the first extruder, an imide resin intermediate 1 was produced using a polymethylmethacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (A1) was extruded through a strand die, cooled in a water tank, and pelletized by a pelletizer.

The obtained glutarimide acrylic resin (A1) is an acrylic resin (A) obtained by copolymerization of a glutarimide unit represented by the general formula (1) and a (meth)acrylic ester unit represented by the general formula (2).

The imidization ratio, glutarimide unit content, acid value, glass transition temperature, and refractive index of the glutarimide acrylic resin (A1) were measured by the above-described methods. As a result, the imidization ratio was 13%, the glutarimide unit content was 7 wt. %, the acid value was 0.4 mmol/g, the glass transition temperature was 130° C., and the refractive index was 1.50. The glutarimide acrylic resin (A1) had a negative photoelastic constant.

Production Example 2

<Production of Graft Copolymer (B1)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 24, and 36 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hr to obtain acrylic rubber particles (polymer (B-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B1).

The average particle diameter of rubber particles (polymer B-1) of the graft copolymer (B1) was 133 nm. The graft ratio of the graft copolymer (B1) was 77%. The Vicat softening point of the graft copolymer (B1) was 81.3° C.

Production Example 3

<Production of graft copolymer (B2)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were respectively added to the polymerization apparatus. After the addition, polymerization was further continued for 0.5 hr to obtain acrylic rubber particles (polymer (B-1)). The polymerization conversion ratio was 99.9%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) was added to the polymerization apparatus, and then 0.2 part of sodium formaldehyde sulfoxylate was fed into the polymerization apparatus. Then, 55.309 parts of a raw material mixture of a hard polymer layer (B-2) shown in Table 2 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B2).

The average particle diameter of rubber particles (polymer B-1) of the graft copolymer (B2) was 117 nm. The graft ratio of the graft copolymer (B2) was 69%. The Vicat softening point of the graft copolymer (B2) was 86.4° C.

Production Example 4

<Production of graft copolymer (B3)>

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.45 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 46.391 parts of a raw material mixture of acrylic rubber particles (B-1) shown in Table 2 was continuously added for 225 minutes. After 50 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added to the polymerization apparatus. After the addition, polymerization was further continued for 0.5 hr to obtain acrylic rubber particles (polymer (B-1)). The polymerization conversion ratio was 99.7%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B3).

The average particle diameter of rubber particles (polymer B-1) of the graft copolymer (B3) was 72 nm. The graft ratio of the graft copolymer (B3) was 87%.

TABLE 2

| Polymers (B) | | B1 | B2 | B3 |
|---|---|---|---|---|
| Acrylic cross-linked polymer layer (acrylic rubber particles) (B-1) | Monofunctional monomer content of (B) (parts) | 45 | 45 | 45 |
| | Butyl acrylate (%) | 90 | 90 | 90 |
| | Methyl methacrylate (%) | 10 | 10 | 10 |
| | Allyl methacrylate (part(s)) | 0.225 | 0.225 | 1.35 |
| | Cumene hydroperoxide (part) | 0.041 | 0.041 | 0.041 |
| | Volume-average particle diameter of (B-1) (nm) | 133 | 117 | 72 |
| Hard polymer layer (B-2) | Monofunctional monomer content of (B) (parts) | 55 | 55 | 55 |
| | Methyl methacrylate (%) | 57.8 | 46.4 | 96 |
| | Butyl acrylate (%) | 4 | 4 | 4 |
| | Benzyl methacrylate (%) | 38.2 | 44.9 | 0 |
| | Methacrylic acid (%) | | 4.7 | |
| | t-dodecyl mercaptane (part) | 0 | 0.055 | |
| | Cumene hydroperxide (part) | 0.254 | 0.254 | 0.254 |
| Sign of birefringence of polymer (B) itself | Orientation birefringence | + | + | − |
| | Photoelastic constant | + | + | − |

Examples 1 to 3, Comparative Examples 1 to 3

A mixture of the acrylic resin (A) and the polymer (B) shown in Table 3 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disk filter with a pore size of 5 μm and connected to a T-die at the outlet thereof and melt-extruded to obtain a film having a thickness shown in Table 3. The preset temperature of temperature control zone of the extruder was 260° C. and the screw rotation speed of the extruder was 20 rpm. Various physical properties of the film were evaluated.

The resin pellets obtained in Examples 1 to 3 were subjected to measurements using a pyrolysis gas chromatograph-mass spectrometry produced by Shimadzu Corporation, and as a result, methanol (71 ppm) and benzyl alcohol (15 ppm) were detected. Therefore, the generation of a glutaric anhydride structure was presumed.

TABLE 3

|  |  |  | Examples | | | Comparative Examples | | |
|---|---|---|---|---|---|---|---|---|
|  |  |  | 1 | 2 | 3 | 1 | 2 | 3 |
|  | Resin (A) | Type | A1 | A1 | A1 | A1 | A1 | A1 |
|  |  | (parts) | 60 | 65 | 70 | 53 | 100 | 53 |
|  | Polymers (B) | Type | B2 | B2 | B2 | B1 | — | B3 |
|  |  | (parts) | 40 | 35 | 30 | 47 | — | 47 |
| Film physical properties | Film thickness | (μm) | 125 | 125 | 125 | 125 | 125 | 125 |
|  | Glass transition temperature (DSC) | (° C.) | 123 | 123 | 124 | 121 | 125 | 123 |
|  | Total light transmittance | (%) | 92.3 | 92.3 | 92.4 | 92.1 | 92.4 | 92.2 |
|  | Haze value | (%) | 0.66 | 0.66 | 0.68 | 0.62 | 0.25 | 0.44 |
|  | Mechanical strength | Evaluation of trimming property | ○ | ○ | Δ | ○ | x | Δ |
|  |  | Tensile elongation at breakage | (%) | 52 | 26 | 19 | 81 | 5 | 51 |
|  |  | Foreign matter |  | ○ | ○ | ○ | ○ | ○ | x |
|  | Heat stability | Ratio of reduction in melt viscosity |  | ○ | ○ | ○ | ○ | ○ | ○ |
|  |  | TGA 1% weight reduction temperature (° C.) |  | 319 | 321 | 327 | 286 | 340 | 286 |
|  |  | Melt viscosity |  | ○ | ○ | ○ | ○ | ○ | x |
|  | Unstretched | Photoelastic constant ($\times 10^{-12}$) | (Pa$^{-1}$) | 0.70 | 0.00 | -0.67 | -0.09 | -4.38 | -4.86 |
|  |  | Orientation birefringence ($\times 10^{-4}$) |  | 0.06 | 0.06 | 0.06 | ±0.07 | ±0.04 | -0.05 |
|  |  | Re (per 100 μm) | nm | 0.7 | 0.6 | 0.7 | ±0.7 | ±0.4 | -0.5 |
|  |  | Rth (per 100 μm) | nm | 0.7 | -0.4 | -2.3 | -1.6 | -0.9 | -1.2 |
|  | Stretched twice | Orientation birefringence ($\times 10^{-4}$) |  | 0.49 | 0.39 | 0.48 | 0.33 | 0.05 | -0.56 |
|  |  | Re (per 100 μm) | nm | 3.5 | 2.8 | 3.4 | 3.3 | 0.5 | -5.6 |
|  |  | Rth (per 100 μm) | nm | 1.5 | 2.2 | -0.1 | 1.1 | 0.5 | -2.2 |
|  | Appearance evaluation of molded body |  | ○ | ○ | ○ | x | ○ | x |
|  | Solvent resistance |  |  | ○ | ○ | ○ | x | ○ | x |

* The symbol "±" means that the sign could not be identified.

As shown in Table 3, the films obtained in Examples 1 to 3 have high heat resistance and high transparency and are also excellent in mechanical strength such as trimming property. Further, the films have low orientation birefringence, and hardly exhibit orientation birefringence even when stretched. In addition, the films have a very small photoelastic constant and hardly exhibit birefringence even when stress is applied thereto. That is, the films have very low optical anisotropy. Further, the compositions have high heat stability and low melt viscosity, and therefore can be filtered with a filter having a small pore size of, for example, 5 μm on molding, which makes it possible to obtain a film having no foreign substances such as fish-eyes. As can be seen from Table 3, the films obtained in Examples 1 to 3 have high heat stability, high solvent resistance, and excellent film appearance.

The invention claimed is:

1. A resin material comprising:
   a thermoplastic resin (A); and
   a polymer (B) satisfying following conditions, wherein:
   the polymer (B) is a graft copolymer obtained by multi-step polymerization; and
   at least one step of the multistep polymerization is polymerization of a monomer mixture containing a monomer represented by a formula (4) and (meth)acrylic acid and/or its salt,

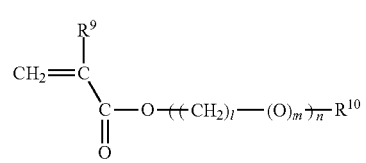

(4)

wherein $R^9$ is a hydrogen atom or a substituted or unsubstituted linear or branched alkyl group having 1 to 12 carbon atoms, $R^{10}$ is a substituted or unsubstituted aromatic group having 3 to 24 carbon atoms or a substituted or unsubstituted alicyclic group having 3 to 24 carbon atoms and having a homocyclic structure or a heterocyclic structure, 1 is an integer of 1 to 4, m is an integer of 0 or 1, and n is an integer of 0 to 10.

2. The resin material according to claim 1, wherein a polymer of the monomer mixture is a hard polymer.

3. The resin material according to claim 1, wherein the monomer mixture contains: 1 to 99.9 wt. % of the monomer represented by the formula (4); 0.1 to 30 wt. % of the (meth)acrylic acid and/or its salt; 98.9 to 0 wt. % of another monomer copolymerizable with the monomer represented by the formula (4) and the (meth)acrylic acid and/or its salt; and 0 to 2.0 parts by weight of a polyfunctional monomer (per 100 parts by weight of a total amount of the monomer represented by the formula (4), the (meth)acrylic acid and/or its salt, and the another monomer copolymerizable with the monomer represented by the formula (4) and the (meth)acrylic acid and/or its salt).

4. The resin material according to claim 1, wherein the graft copolymer has a cross-linked structure.

5. The resin material according to claim 1, wherein the graft copolymer has a cross-linked structure constituted by a (meth)acrylic cross-linked polymer.

6. The resin material according to claim 4, wherein the cross-linked structure is formed by polymerization of: 50 to 100 wt. % of acrylic ester; 50 to 0 wt. % of another monomer copolymerizable with the acrylic ester; and 0.05 to 10 parts by weight of a polyfunctional monomer (per 100 parts by weight of a total amount of the acrylic ester and the another monomer copolymerizable with the acrylic ester).

7. The resin material according to claim 1, wherein the graft copolymer is formed by:
(B-1) performing polymerization of a monomer mixture of 50 to 100 wt. % of acrylic ester, 50 to 0 wt. % of another monomer copolymerizable with the acrylic ester, and 0.05 to 10 parts by weight of a polyfunctional monomer (per 100 parts by weight of a total amount of the acrylic ester and the another monomer copolymerizable with the acrylic ester) to obtain a (meth)acrylic cross-linked structure-containing polymer; and
(B-1) in a presence of the (meth)acrylic cross-linked structure-containing polymer, performing polymerization of the monomer mixture containing the monomer represented by the formula (4) and the (meth)acrylic acid and/or its salt.

8. The resin material according to claim 4, wherein a volume-average particle diameter to the cross-linked structure is 20 to 450 nm.

9. The resin material according to claim 4, wherein a content of the cross-linked structure is 1 to 60 parts by weight with respect to 100 parts by weight of the resin material.

10. The resin material according to claim 1, wherein the monomer represented by the formula (4) is at least one selected from the group consisting of benzil (meth)acrylate, dicyclopentanyl (meth)acrylate, and phenoxyethyl (meth)acrylate.

11. The resin material according claim 1, wherein the thermoplastic resin (A) is an acrylic resin.

12. The resin material according to claim 1, wherein the thermoplastic resin (A) has a glass transition temperature of not less than 100° C.

13. The resin material according to claim 1, wherein an acid value of the thermoplastic resin (A) is 0.01 to 5 mmol/g.

14. The resin material according to claim 1, wherein the thermoplastic resin (A) contains at least one selected from the group consisting of: a glutarimide acrylic resin; a lactone ring-containing acrylic polymer; a partially-hydrogenated styrene-based polymer obtained by partial hydrogenation of aromatic rings of a styrene-based polymer obtained by polymerization of a styrene monomer and another monomer copolymerizable with the styrene monomer; an acrylic polymer containing a cyclic acid anhydride repeating unit; an acrylic resin copolymerized with an N-substituted maleimide compound as a copolymerization component; and a hydroxyl group- and/or carboxyl group-containing acrylic polymer.

15. The resin material according to claim 1, wherein the thermoplastic resin (A) contains a glutarimide acrylic resin including a unit represented by a following general formula (1) and a unit represented by a following general formula (2),

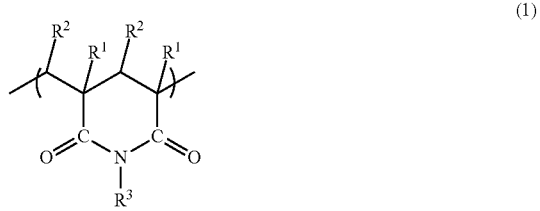

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms,

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

16. The resin material according to claim 15, wherein the glutarimide acrylic resin does not contain a unit represented by a following general formula (3),

(3)

wherein $R^7$ is hydrogen or an alkyl group having 1 to 8 carbon atoms and $R^8$ is an aryl group having 6 to 10 carbon atoms.

17. The resin material according to claim 1, wherein a 1% weight reduction temperature of the resin material is not less than 290° C.

18. The resin material according to claim 1, wherein a tensile elongation at breakage of the resin material is not less than 10%.

19. The resin material according to claim 1, wherein a photoelastic constant of the thermoplastic resin (A) and a photoelastic constant of the polymer (B) are different in sign from each other.

20. The resin material according to claim 1, wherein an orientation birefringence of the resin material is $-1.7 \times 10^{-4}$ to $1.7 \times 10^{-4}$.

21. The resin material according to claim 1, wherein a photoelastic constant of the resin material is $-4 \times 10^{-12}$ to $4 \times 10^{-12}$ $Pa^{-1}$.

22. The resin material according to claim 1, further comprising birefringent inorganic microparticles.

23. The resin material according to claim 1, further comprising a birefringent low-molecular compound.

24. A molded body formed by the resin material according to claim 1.

25. A film formed by the resin material according to claim 1.

26. A film formed by melt extrusion of the resin material according to claim 1.

27. The film according to claim 25, wherein the film is an optical film.

28. The film according to claim 25, wherein the film has a thickness of 10 to 500 μm.

29. The film according to claim 25, wherein an orientation birefringence of the film is $-1.7 \times 10^{-4}$ to $1.7 \times 10^{-4}$.

30. The film according to claim 25, wherein a photoelastic constant of the film is $-4 \times 10^{-12}$ to $4 \times 10^{-12}$ $Pa^{-1}$.

31. The film according to claim 25, wherein a tensile elongation at breakage of the film is not less than 10%.

32. A pellet obtained by heating and melting the resin material according to claim 1.

33. The resin material according to claim 1, wherein a polymer formed by the polymerization of the monomer mixture containing the monomer represented by the formula (4) and the (meth)acrylic acid and/or its salt in the polymer (B) includes: a structural unit containing carboxyl group and/or its salt; and/or an acid anhydride structural unit.

* * * * *